United States Patent
Lentz

(10) Patent No.: US 11,143,860 B1
(45) Date of Patent: Oct. 12, 2021

(54) PHOTONIC CRYSTAL-BASED OPTICAL STEERING

(71) Applicant: Government of the United States, as represented by the Secretary of the Air Force, Wright-Patterson AFB, OH (US)

(72) Inventor: Joshua K. Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 373 days.

(21) Appl. No.: 16/397,126

(22) Filed: Apr. 29, 2019

(51) Int. Cl.
G02B 26/10 (2006.01)
H04N 5/238 (2006.01)
G02B 1/00 (2006.01)

(52) U.S. Cl.
CPC ............ *G02B 26/10* (2013.01); *G02B 1/005* (2013.01); *H04N 5/238* (2013.01)

(58) Field of Classification Search
CPC ...... G02B 26/10; G02B 1/005; H01Q 15/006; H01Q 3/02
See application file for complete search history.

(56) References Cited

U.S. PATENT DOCUMENTS

| | | | |
|---|---|---|---|
| 5,093,740 A | 3/1992 | Dorschner et al. | |
| 6,650,407 B2 | 11/2003 | Jamieson et al. | |
| 6,765,644 B1 | 7/2004 | Anderson et al. | |
| 6,999,669 B2 | 2/2006 | Summers et al. | |
| 7,146,070 B1 | 12/2006 | Li et al. | |
| 7,187,491 B1 | 3/2007 | Bratkovski | |
| 7,283,716 B2 | 10/2007 | Park et al. | |
| 8,659,813 B2 | 2/2014 | Davis et al. | |
| 8,977,084 B2 | 3/2015 | Hulsey | |
| 8,982,313 B2 | 3/2015 | Escuti et al. | |
| 9,195,092 B2 | 11/2015 | Escuti et al. | |
| 9,726,783 B2 | 8/2017 | Perrier-Cornet et al. | |
| 9,897,892 B2 | 2/2018 | Auxier et al. | |
| 9,964,833 B2 | 5/2018 | Eldada | |
| 10,007,001 B1 | 6/2018 | LaChapelle et al. | |
| 2007/0024978 A1 | 2/2007 | Jackson et al. | |
| 2008/0291101 A1* | 11/2008 | Braunstein ........... | H01Q 15/006 343/754 |

(Continued)

OTHER PUBLICATIONS

Wu, L., et al., "Beam Steering in Planar-Photonic Crystals: From Superprism to Supercollimator," Journal of Lightwave Technology, vol. 21, No. 2, Feb. 2003, pp. 561-566.

(Continued)

*Primary Examiner* — Maurice C Smith
(74) *Attorney, Agent, or Firm* — AFMCLO/JAZ; Jeffrey R. Moore

(57) ABSTRACT

A system, apparatus, and method include an optical steering system including a holder with a plurality of apertures; a photonic crystal mounted in each of the plurality of apertures; a light source to direct a path of light through the photonic crystal; a motion controller to control movement of the holder to sequentially insert each photonic crystal of the plurality of apertures into the path of light; and a sensor to detect optical energy arriving from each direction of the path of light passing through each photonic crystal.

20 Claims, 18 Drawing Sheets

(56) References Cited

U.S. PATENT DOCUMENTS

| | | | |
|---|---|---|---|
| 2013/0003768 A1* | 1/2013 | Noda | H01S 5/11 |
| | | | 372/41 |
| 2016/0161822 A1 | 6/2016 | Kim et al. | |
| 2016/0259090 A1 | 9/2016 | Jiang et al. | |
| 2017/0123288 A1 | 5/2017 | Dmitriev et al. | |
| 2017/0159206 A1 | 6/2017 | Li et al. | |
| 2017/0361398 A1 | 12/2017 | Kleinert | |

OTHER PUBLICATIONS

Hirose, K., et al., "Watt-class high-power, high-beam-quality photonic-crystal lasers," Nature Photonics, DOI: 10.1038/NPHOTON.2014. 75, Apr. 13, 2014, pp. 1-6.

Kurosaka, Y., et al., "On-Chip Beam-Steering Photonic-Crystal Lasers," Nature Photonics, vol. 4, DOI: 10.1038/NPHOTON.2010. 118, May 2, 2010, pp. 447-450.

Anderson, P., et al., "Improving emission uniformity and linearizing band dispersion in nanowire arrays using quasi-aperiodicity," Optical Materials Express, vol. 7, No. 10, Oct. 1, 2017, pp. 3634-3642.

Liu, X., et al., "Full-spectrum light management by pseudo-disordered moth-eye structures for thin film solar cells," Optics Express, vol. 25, No. 16, Aug. 7, 2017, pp. A824-A839.

Liu, L., et al., "A strain-tunable nanoimprint lithography for linear variable photonic crystal filters," Nanotechnology, vol. 27, No. 29, Jun. 8, 2016, pp. 1-6.

Rumpf, R., et al., "Spatially variant periodic structures in electromagnetics," Phil. Trans. R. Soc. A 373, Aug. 28, 2015, pp. 1-22.

Digaum, J., et al., "Beam-bending in spatially variant photonic crystals at telecommunications wavelengths," Proc. SPIE 9759, Advanced Fabrication Technologies for Micro/Nano Optics and Photonics IX, Mar. 14, 2016, pp. 975911-1 through 975911-6.

Beaulieu, M., et al., "Large-Area Printing of Optical Gratings and 3D Photonic Crystals Using Solution-Processable Nanoparticle/Polymer Composites," ACS Photonics 2014, 1(9), Aug. 11, 2014, pp. 799-805.

Sun, T., et al., "Photonic crystal structures on nonflat surfaces fabricated by dry lift-off soft UV nanoimprint lithography," Journal of Micromechanics and Microengineering, vol. 23, No. 12, Oct. 30, 2013, pp. 1-7.

Calafiore, G., et al., "Printable photonic crystals with high refractive index for applications in visible light," Nanotechnology, vol. 27, No. 11, Feb. 15, 2016, pp. 1-7.

Pazos, J., "Digitally Manufactured Spatially Variant Photonic Crystals," Doctoral Dissertation, Department of Electrical and Computer Engineering, The University of Texas at El Paso, 2014, 102 pages.

* cited by examiner

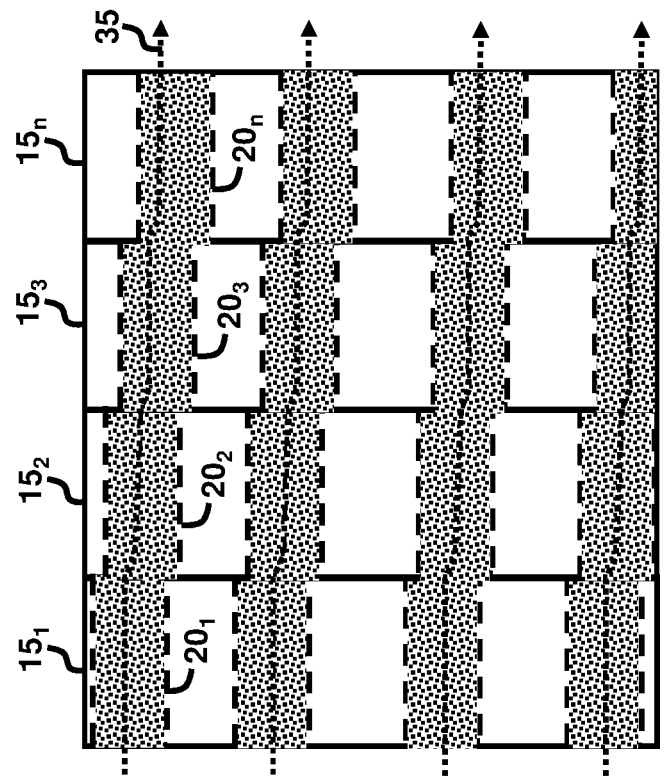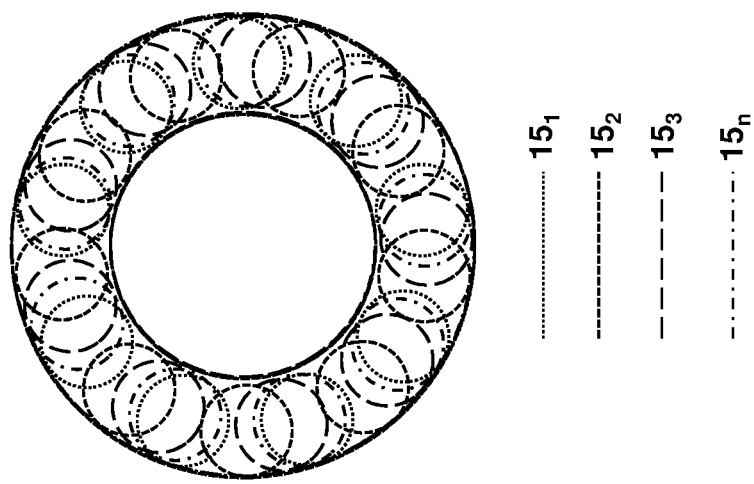

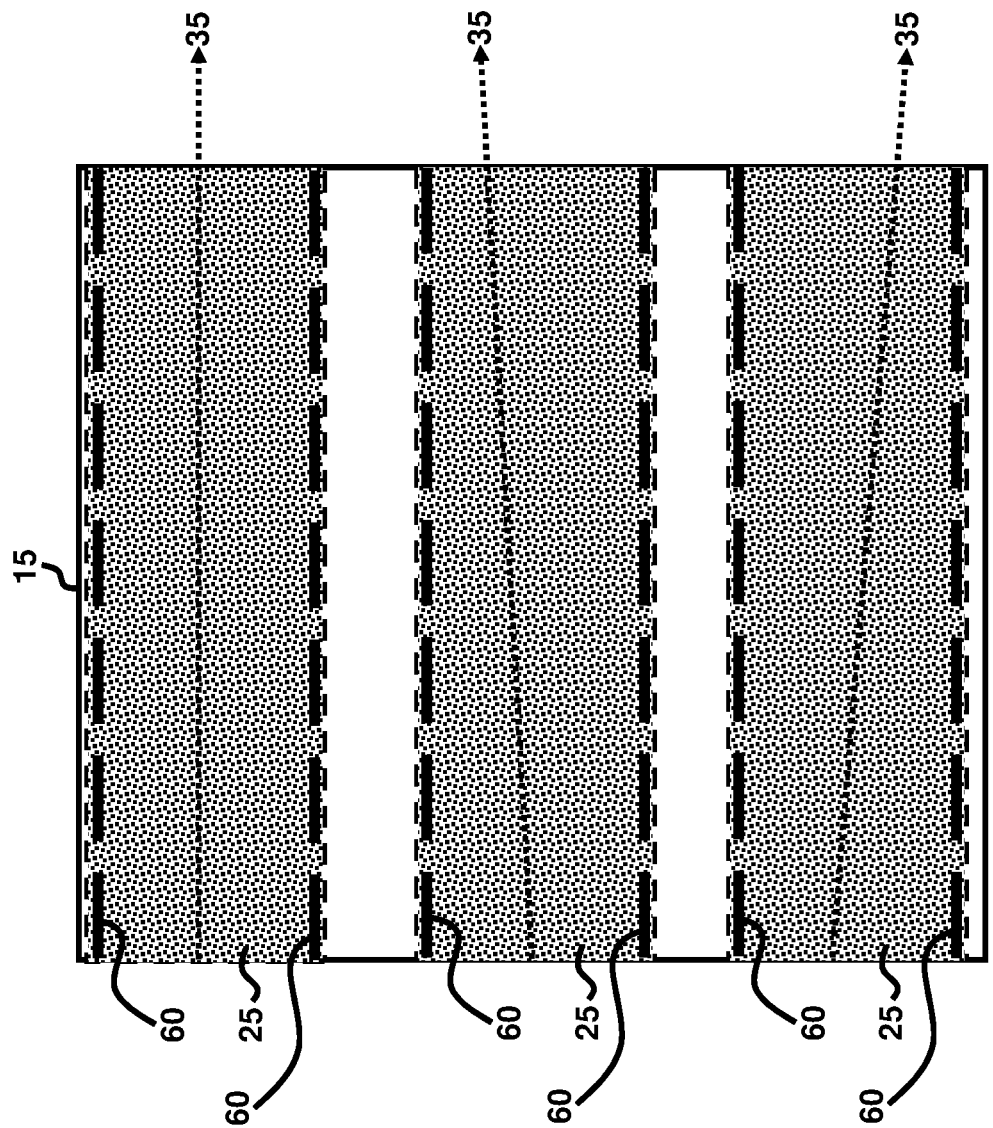

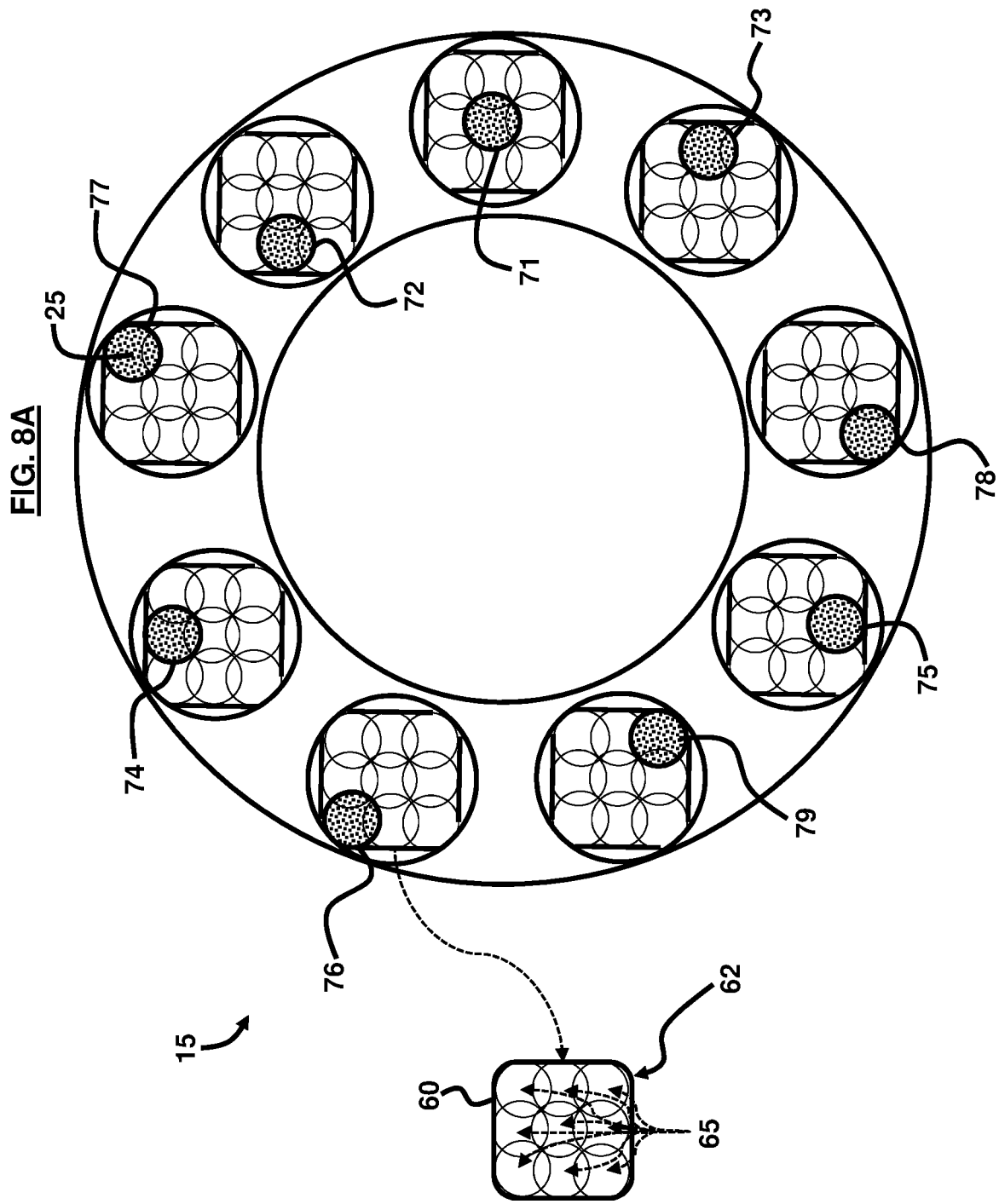

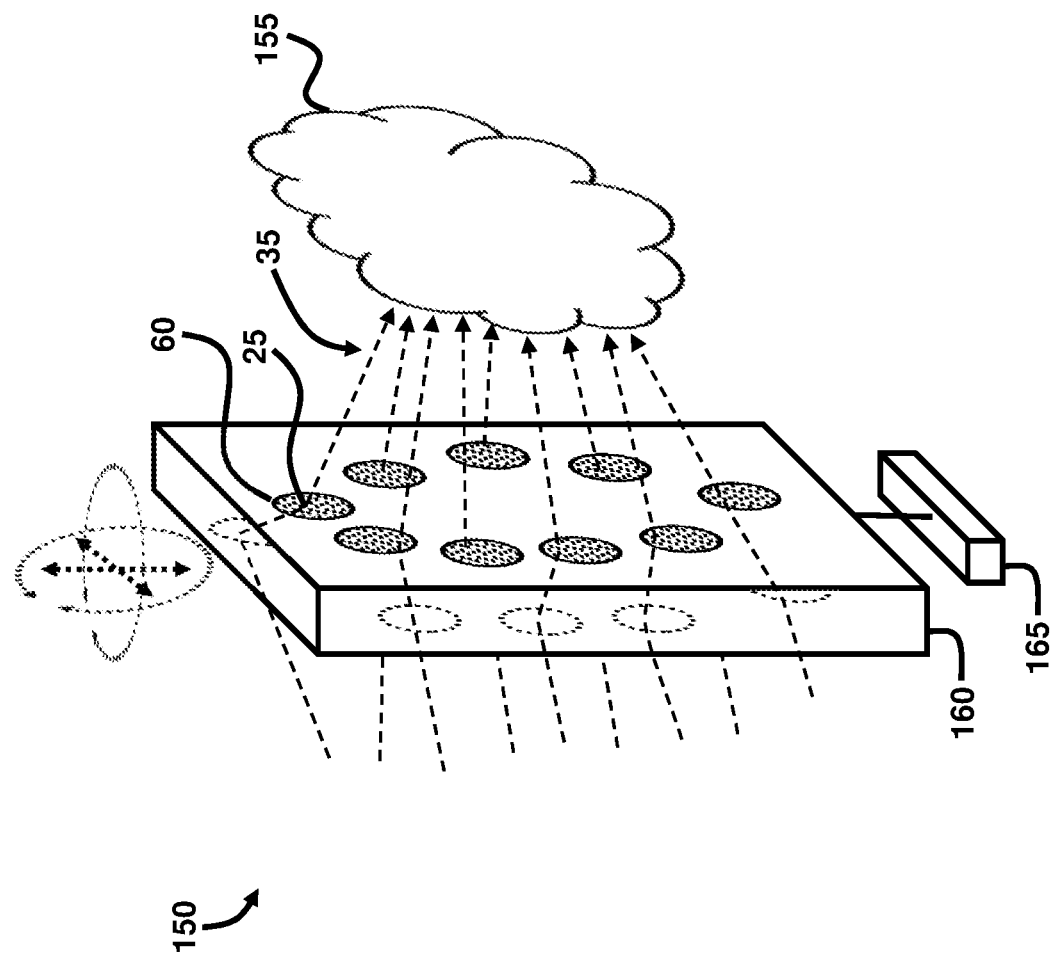

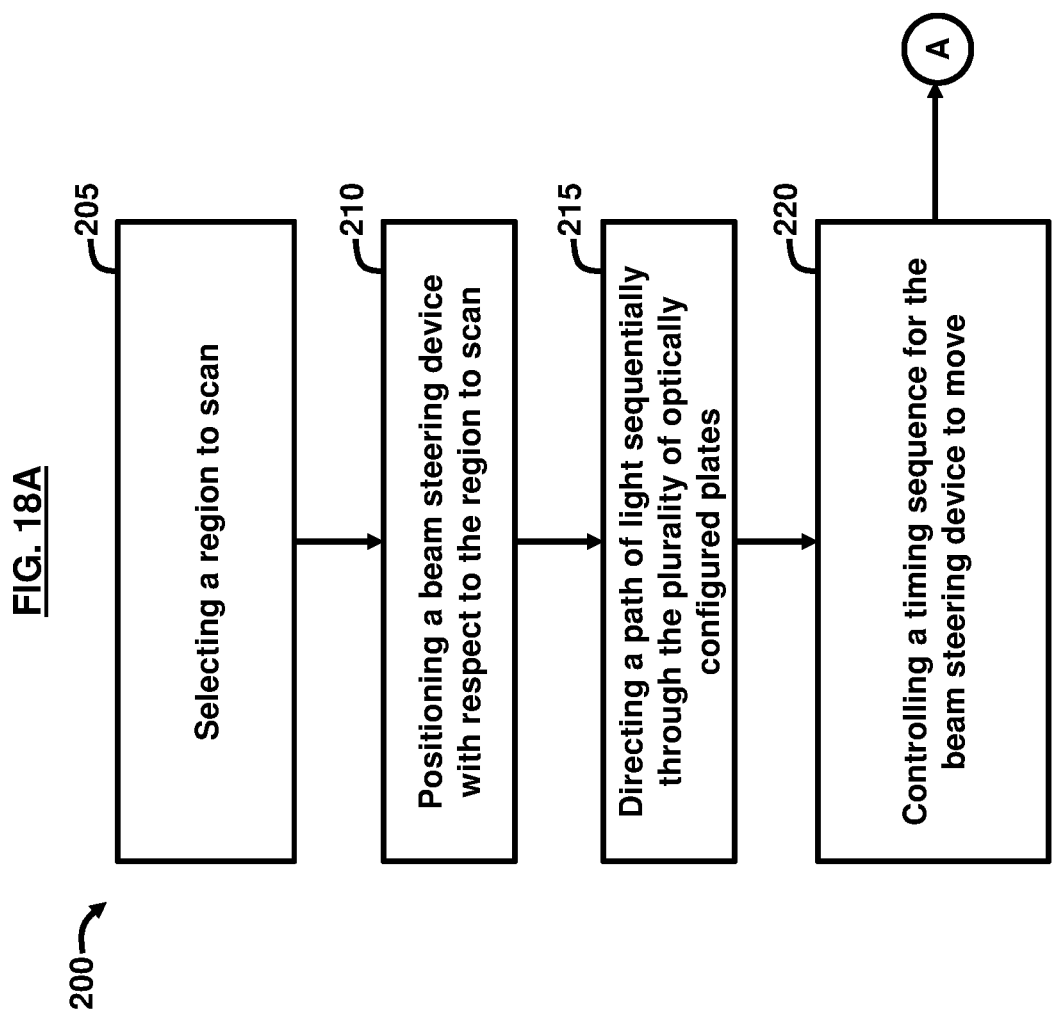

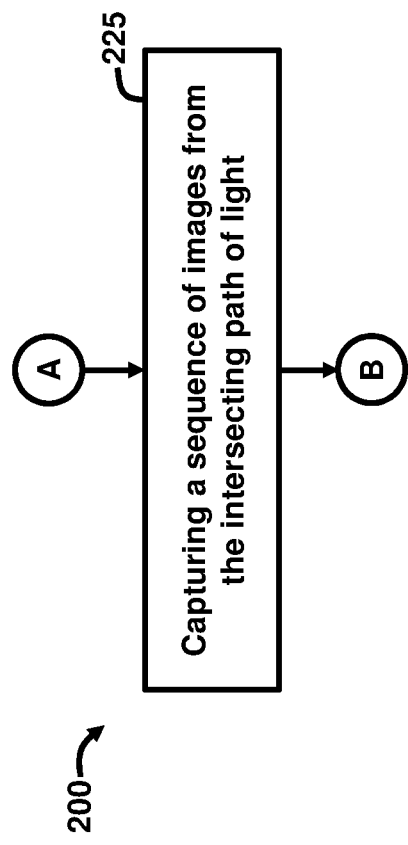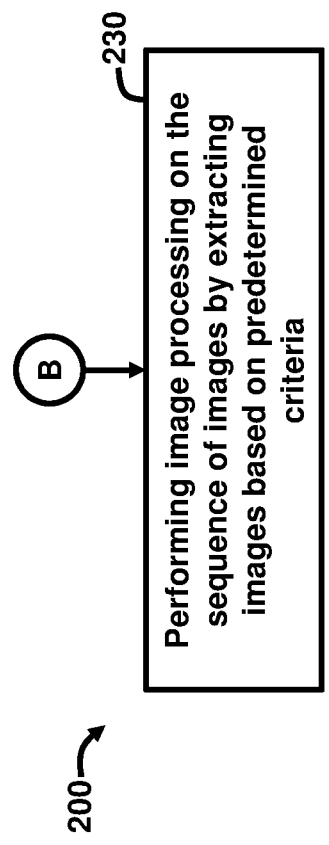

PHOTONIC CRYSTAL-BASED OPTICAL STEERING

GOVERNMENT INTEREST

The invention described herein may be manufactured and used by or for the Government of the United States for all government purposes without the payment of any royalty.

BACKGROUND

Field of the Invention

The embodiments herein generally relate to optical beam steering, and more particularly to optical beam steering using photonic devices.

Background of the Invention

Traditional optical steering devices may rely on mirrored systems based on gimbals or motor shafts to provide steering of light. Gimbal-based systems tend to be large and heavy, with size and weight increasing with operation speed. Gimbal systems can also be very expensive for precision applications over moderate fields. Other steering systems include liquid crystal on silicon (LCoS), Risley Prisms, and polarization gratings. LCoS tends to be inherently limited to narrow spectral bands and is very expensive. Risley prisms, by themselves, can introduce chromatic aberrations and can be heavy for larger diameter systems. Polarization gratings are polarization sensitive and tend to have low throughput for unpolarized applications. Transmitting beams through mirrors, lens, and other refractive systems allows the beam to be steered as desired. Some applications of beam steering include signal processing, which may be used for medical imaging and electronic displays, among other uses. In these applications, improved beam steering may help in enhancing the image processing. Moreover, in image processing technologies, wide field imaging of an object with a narrow field of view system often generates sectioned portions containing seams resulting in disjointed images. Enhancing images in wide field scenarios may be helpful in various commercial, military, research, and academic applications.

BRIEF SUMMARY OF THE INVENTION

In view of the foregoing, an embodiment herein provides an optical steering system comprising a holder comprising a plurality of apertures; a photonic crystal mounted in each of the plurality of apertures; a light source to direct a path of light through the photonic crystal; a motion controller to control movement of the holder to sequentially insert each photonic crystal of the plurality of apertures into the path of light; and a sensor to detect optical energy arriving from each direction of the path of light passing through each photonic crystal. The holder may comprise a ring-shaped device comprising the plurality of apertures arranged circumferentially thereon. The system may comprise a plurality of holders adjacent to one another and each comprising the plurality of apertures containing each photonic crystal. The motion controller may control the plurality of holders to move independently of one another. The plurality of holders may be configured with a different angular offset with respect to each other and the path of light. The plurality of apertures may comprise nine apertures. Each of the plurality of apertures may comprise a plate containing the photonic crystal, and wherein the plate comprises a field of view arrangement to optically steer the path of light in a different direction from other photonic crystals contained in the holder.

The field of view arrangement may comprise a combination of positions in the plate where the photonic crystal is disposed, and wherein the positions comprise a central region, a left region, a right region, a top region, a bottom region, and one of each of four diagonal edge regions which combine to create a full angle field of view for the path of light detected by the sensor. The field of view arrangement may comprise a combination of positions in the plate where the photonic crystal is disposed, and wherein the positions comprise a central region, either a left or right region, and one of four diagonal edge regions which combine to create a full angle field of view for the path of light detected by the sensor.

The plate containing the central region position of the photonic crystal may be mounted in a fixed holder without movement. The system may comprise a shutter over any or all of the plurality of apertures. The system may comprise an image processor operatively connected to the sensor to create a total field of view image based on the path of light passing through each photonic crystal sequentially for all photonic crystals contained in the holder.

Another embodiment provides an apparatus comprising a plurality of ring-shaped holders each comprising a plurality of optically configured plates circumferentially arranged on a rim of the holders; and a photonic crystal positioned in each of the plurality of optically configured plates, wherein the photonic crystal is configured to permit a path of light to be transmitted therethrough, and wherein movement of the ring-shaped holders directs the path of light to be transmitted through each photonic crystal in sequence with respect to the plurality of optically configured plates. The photonic crystal may comprise a spatially variant photonic crystal. The movement of the plurality of ring-shaped holders may comprise a rotational movement. The photonic crystal in each plate may be configured to direct a different light segment of the path of light out of each of the plurality of optically configured plates. The plurality of optically configured plates may each comprise a pair of photonic crystals having equal angular deviations for a transmitted path of light.

Another embodiment provides a method of performing optical beam steering, the method comprising selecting a region to scan; positioning a beam steering device with respect to the region to scan, wherein the beam steering device comprises a plurality of optically configured plates each containing an optical element that provides a fixed angular offset; directing a path of light sequentially through the plurality of optically configured plates; and controlling a timing sequence for the beam steering device to move, wherein the timing sequence causes a time delay of the plurality of optically configured plates in the beam steering device to intersect the path of light. The method may comprise capturing a sequence of images from the intersecting path of light. The method may comprise performing image processing on the sequence of images by extracting images based on predetermined criteria.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5A is a schematic diagram illustrating a front view of the plurality of holders of FIG. 3 configured with a different angular offset, according to an embodiment herein;

FIG. 5B is a schematic diagram illustrating a cross-sectional view of the plurality of holders of FIG. 3 configured with a different angular offset, according to an embodiment herein;

FIG. 7B is a schematic diagram illustrating a cross-sectional view of a plate in the apertures of the holder, according to an embodiment herein;

FIG. 8A is a schematic diagram illustrating a front view of a field of view arrangement of the plate of FIGS. 7A and 7B, according to an embodiment herein;

FIG. 15 is a schematic diagram illustrating a system for performing optical beam steering, according to an embodiment herein;

FIG. 18A is a flow diagram illustrating a method of performing optical beam steering, according to an embodiment herein;

FIG. 18B is a flow diagram illustrating a method of capturing a sequence of images, according to an embodiment herein; and FIG. 18C is a flow diagram illustrating a method of performing image processing, according to an embodiment herein.

DETAILED DESCRIPTION OF THE INVENTION

Figure 1:
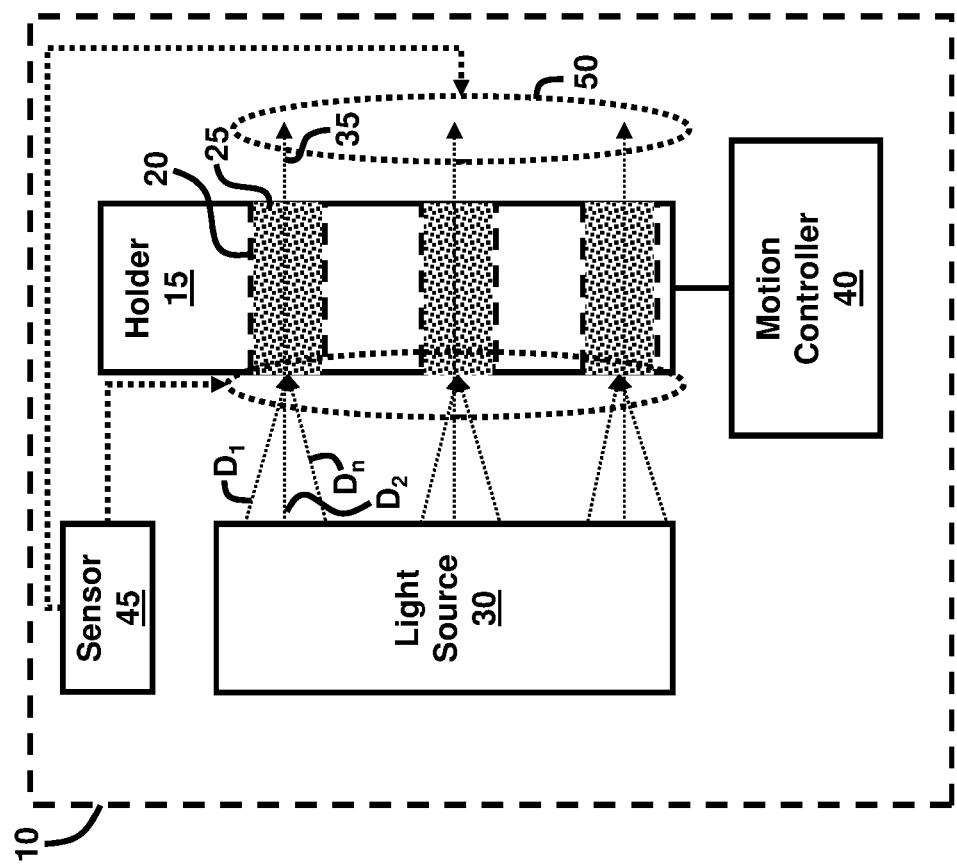
FIG. 1 is a system block diagram illustrating an optical steering system, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

According to various examples, the embodiments herein provide a compact beam steering device based on photonic crystals designed to induce an angular offset of optical energy. In an example, a set of such plates are mounted in a rotating holder that can sequentially insert each of the plates into the optical path, creating a scanning process over a designed field of regard (FOR). The embodiments herein include photonic crystal structures, each structure being supported by a substrate. The substrate material is selected to have appropriate transmission characteristics for the spectrum of interest. The hardness of the material is also an aspect to consider to allow a rigid enough substrate to exist without an excessive thickness. In another example, a series of flip mounts replaces the rotating holder. For each region to be viewed, instead of rotating the ring to the correct photonic crystal, the flip mount for the correct photonic crystal would flip the photonic crystal into the light path, and all other photonic crystals would flip out. The embodiments herein may: (a) provide an optical steering function for detection over larger field of regard (FORs) than allowed by the device field of view (FOV); and (b) provide steering of a laser beam (or other optical energy) around an area of interest.

Referring now to the drawings, and more particularly to FIGS. 1 through 18C where similar reference characters denote corresponding features consistently throughout, there are shown exemplary embodiments. In the drawings, the size and relative sizes of components, layers, and regions may be exaggerated for clarity.

FIG. 1 illustrates an optical steering system 10 comprising a holder 15 comprising a plurality of apertures 20. The holder 15 may include any suitable configuration or shape and comprise any suitable material. Some example configurations and shapes are rings, plates, and spheres. Some example materials include durable plastics, lightweight metals, and composites. The number of plurality of apertures 20 may vary depending on the size, shape, and/or configuration of the holder 15. Moreover, the size of the plurality of apertures 20 may be any suitable size, which may also be based, in part, on the size, shape, and/or configuration of the holder 15. Furthermore, the plurality of apertures 20 in the holder 15 may include consistent sizes, according to one example; e.g., all of the plurality of apertures 20 constitute the same size and configuration. In another example, the plurality of apertures 20 may have inconsistent sizes; e.g., the plurality of apertures 20 do not have the same size and configuration as one another. The size(s), shape(s), and configurations of the plurality of apertures 20 may be selected based on any suitable size, shape, and configuration. For example, the plurality of apertures 20 may be circular or non-circular shaped. Furthermore, according to an example, the plurality of apertures 20 may be configured to extend through the entire width (i.e., thickness) of the holder 15.

The optical steering system 10 further comprises a photonic crystal 25 mounted in each of the plurality of apertures 20. In some examples, the photonic crystal 25 may comprise any of periodic dielectric, metallo-dielectric, and superconductor microstructures or nanostructures, which may be configured as any of one-dimensional, two-dimensional, and three-dimensional crystals. Furthermore, the photonic crystal 25 may comprise one or more colors or may be substantially clear.

The optical steering system 10 further comprises a light source 30 to direct a path of light 35 through the photonic crystal 25. According to some examples, the light source 30 may comprise an infrared light-emitting diode (IR LED), a fluorescent lamp, or other type of component capable of directing the path of light 35. The path of light 35 may be emitted in a substantially uniform manner or may be directed non-uniformly, and may comprise any color or stream of colors, according to various examples. The light source 30 may direct the path of light 35 such that only portions of the light source 30 direct the path of light 35, or the path of light 35 may be directed in phases and intensities from the light source 35 including in a strobe-like effect. The path of light 35 may be directed linearly away from the light source 30 and at any suitable angle. Furthermore, the light source 30 may direct the path of light 35 at any suitable intensity level, which may be based, on part, on the power of the light source 30.

The optical steering system 10 further comprises a motion controller 40 to control movement of the holder 15 to sequentially insert each photonic crystal 25 of the plurality of apertures 20 into the path of light 35. According to various examples, the motion controller 40 may comprise any of an electrical device, mechanical device, electromechanical device, magnetic device, motor, gear drive, belt, piezoelectric device, or a combination thereof. The motion controller 40 may be operatively connected to the holder 15 through any of a wired or wireless connection. Moreover, the motion controller 40 may cause the holder 15 to move in any suitable direction and/or orientation including in a translational motion, or a rotational motion, or a combination thereof. The holder 15 may rotate about its central longitudinal axis, according to an example, and the rotation speed may be selected at any suitable frequency (e.g., 100 Hz, 1000 Hz, etc.). The motion of the holder 15 causes the photonic crystal 25 in the plurality of apertures 20 to intersect the path of light 35. The holder 15 described herein can be substituted by any type of device or mechanism that allows the photonic crystal 25 to be mechanically switched in and out of the optical path of light 35. The motion controller 40 may be programmed to move the holder 15 in a continuous motion or in a discrete motion with periodic delays in the motion.

The optical steering system 10 further comprises a sensor 45 to detect optical energy 50 arriving from each direction $D_1 \ldots D_n$ of the path of light 35 passing through each photonic crystal 25. A unique region of the path of light 35 is directed to the sensor 45 for each position of the holder 15. In some examples, the sensor 45 may comprise a photodiode power sensor, a power and energy sensor, a thermal power sensor, a detector, or a combination thereof, and may detect the optical energy 50 across a broad range of powers, energies, and wavelengths. In an example, the path of light 35 may be directed in multiple directions $D_1 \ldots D_n$ into the photonic crystal 25 in the holder 15. Moreover, in another example, the path of light 35 may be directed in one direction into the photonic crystal 25 in the holder 15. The sensor 45 may be operatively connected to the holder 15 and/or the motion controller 40 through any of a wired or wireless connection, and the sensor 45 may be positioned at any suitable position with respect to the holder 15 and/or the photonic crystal 25 in each of the plurality of apertures 20. In an example, the sensor 45 may detect the optical energy 50 prior to transmission through the photonic crystal 25 and after transmission through the photonic crystal 25. According to an example, the sensor 45 may detect the optical energy 50 and provide feedback to the motion controller 40, which may cause the motion controller 40 to change the speed and/or direction of the motion of the holder 15. Furthermore, the sensor 45 may convert the optical energy 50 from the path of light 35 into an electrical signal, magnetic signal, or another optical signal.

Figure 2:
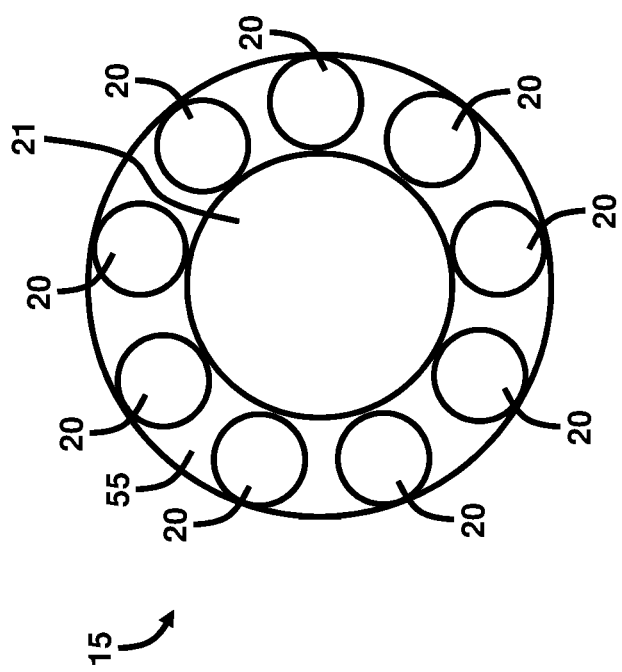
FIG. 2 is a schematic diagram illustrating the holder, with apertures, of the optical steering system of FIG. 1 configured as a ring-shaped device, according to an embodiment herein.

FIG. 2, with reference to FIG. 1, illustrates that the holder 15 comprises a ring-shaped device 55 comprising the plurality of apertures 20 arranged circumferentially thereon. In an example, the plurality of apertures 20 may be evenly spaced along the ring-shaped device 55. In another example, the plurality of apertures 20 may be unevenly spaced along the ring-shaped device 55, and may be arranged in any suitable pattern or arrangement. The plurality of apertures 20 may be configured to extend through the entire width (i.e., thickness) of the holder 15. The holder 15 may also comprise a hole 21 configured to extend through the entire width (i.e., thickness) of the holder 15. In an example, the hole 21 may be substantially positioned in the center of the ring-shaped device 55. Moreover, the hole 21 may comprise any suitable shape or configuration including circular or non-circular shapes. Furthermore, the hole 21 may be larger, smaller, or the same size as any of the plurality of apertures 20.

Figure 3:
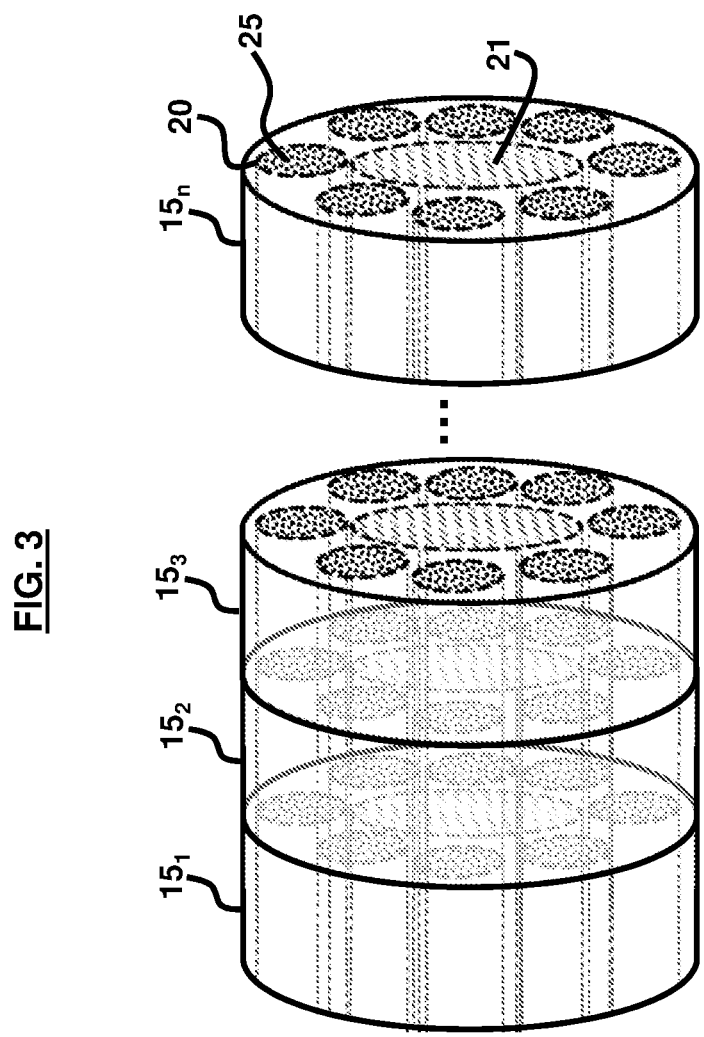
FIG. 3 is a schematic diagram illustrating a plurality of holders in the optical steering system of FIG. 1, according to an embodiment herein.

FIG. 3, with reference to FIGS. 1 and 2, illustrates that the system 10 comprises a plurality of holders $15_1 \ldots 15_n$ adjacent to one another and each comprising the plurality of apertures 20 containing each photonic crystal 25. In one example, the plurality of holders $15_1 \ldots 15_n$ may be directly connected to one another in a stacked configuration. In another example, the plurality of holders $15_1 \ldots 15_n$ may be aligned to one another with a gap between each of the plurality of holders $15_1 \ldots 15_n$. Furthermore, the plurality of holders $15_1 \ldots 15_n$ may be aligned along the hole 21 of each of the plurality of holders $15_1 \ldots 15_n$. Moreover, the plurality of holders $15_1 \ldots 15_n$ may be aligned in any other suitable arrangement. The plurality of holders $15_1 \ldots 15_n$ may be held together using any suitable attachment mechanism or material, and may, for example, utilize mechanical, magnetic, or adhesives, or combinations thereof to connect the plurality of holders $15_1 \ldots 15_n$ together. In an example, a rod, shaft, or any other type of elongated member (for example, as depicted by the motion controller 40 in FIG. 4) may be inserted through the hole 21 of each of the plurality of holders $15_1 \ldots 15_n$ and may be used to rotate the plurality of holders $15_1 \ldots 15_n$.

Figure 4:
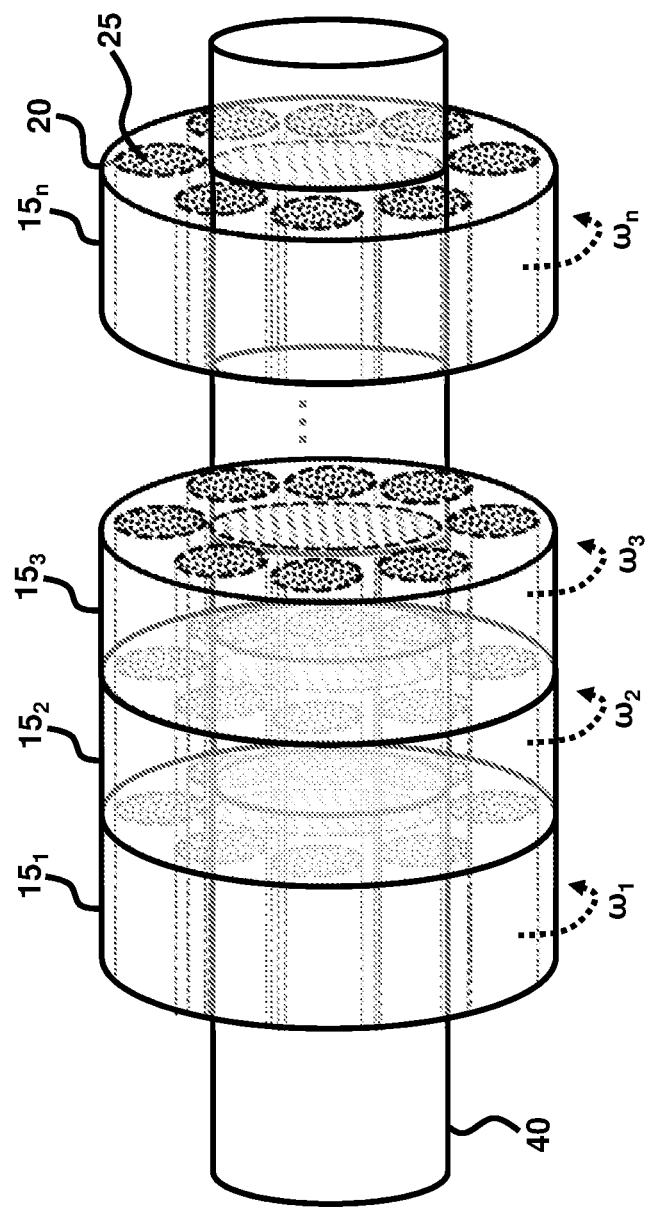
FIG. 4 is a schematic diagram illustrating a motion controller that controls the plurality of holders of FIG. 3, according to an embodiment herein.

FIG. 4, with reference to FIGS. 1 through 3, illustrates that the motion controller 40 controls the plurality of holders $15_1 \ldots 15_n$ to move independently of one another; i.e., with independent rotations $\omega_1 \ldots \omega_n$. In FIG. 4, the motion controller 40 is shown to extend through the holes 21 of the aligned plurality of holders $15_1 \ldots 15_n$, however the motion controller 40 may be positioned at any suitable position with respect to the plurality of holders $15_1 \ldots 15_n$. In an example, the independent rotations $\omega_1 \ldots \omega_n$ may comprise different rotational speeds or they may comprise the same rotational speed. However, the motion controller 40 may independently control each of the plurality of holders $15_1 \ldots 15_n$ to move the plurality of holders $15_1 \ldots 15_n$ independently; i.e., with independent rotations $\omega_1 \ldots \omega_n$. According to some examples, the rotations $\omega_1 \ldots \omega_n$ may be in a clockwise or counterclockwise motion.

FIGS. 5A and 5B, with reference to FIGS. 1 through 4, illustrate that each of the plurality of holders $15_1 \ldots 15_n$ are configured with a different angular offset with respect to each other and the path of light 35. The configuration permits the photonic crystal 25 to induce an angular offset in the optical energy 50. In this regard, the plurality of apertures $20_1 \ldots 20_n$ corresponding to the plurality of holders $15_1 \ldots 15_n$ may be misaligned with one another (i.e., with a different angular offset with respect to each other and the path of light 35). In an example, the different angular offset, and accordingly the misalignment of the plurality of apertures $20_1 \ldots 20_n$ may occur due to the independent rotations $\omega_1 \ldots \omega_n$ of the plurality of holders $15_1 \ldots 15_n$, as controlled by the motion controller 40. According to another example, the plurality of holders $15_1 \ldots 15_n$ may be connected to each other in a predetermined arrangement such that the plurality of apertures $20_1 \ldots 20_n$ are misaligned and set into position.

Figure 6:
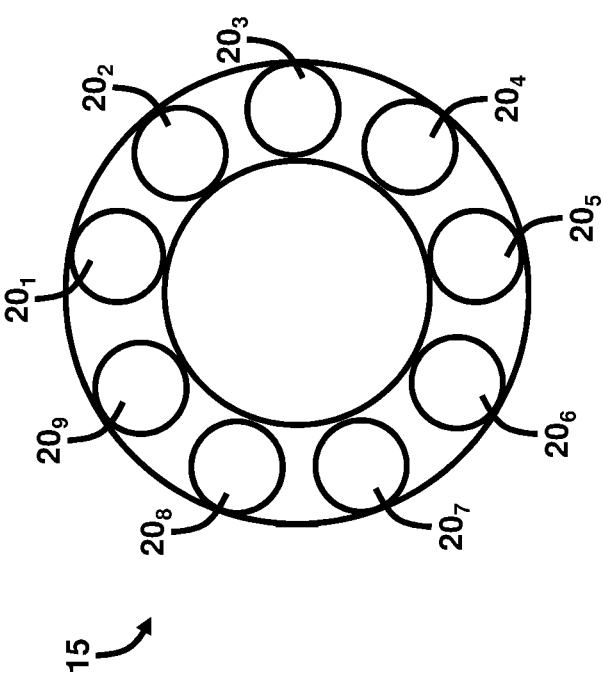
FIG. 6 is a schematic diagram illustrating the holder, with nine apertures, of the optical steering system of FIG. 1, according to an embodiment herein.

FIG. 6, with reference to FIGS. 1 through 5B, illustrates that the plurality of apertures 20 comprises nine apertures $20_1 \ldots 20_9$, according to an example. While nine apertures $20_1 \ldots 20_9$ are shown and described, the embodiments herein are not restricted to any particular number of apertures 20. Moreover, the nine apertures $20_1 \ldots 20_9$ may be arranged such that they are evenly spaced apart from one another in the holder 15. Furthermore, the nine apertures $20_1 \ldots 20_9$ may be any suitable size or shape.

Figure 7A:
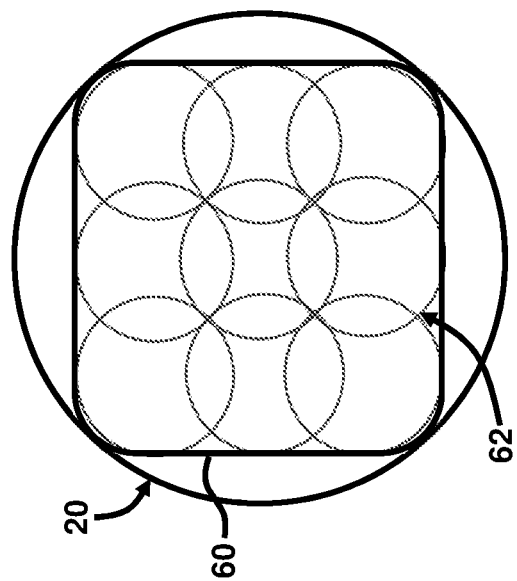
FIG. 7A is a schematic diagram illustrating a front view of a plate in the apertures of the holder, according to an embodiment herein.

FIGS. 7A and 7B, with reference to FIGS. 1 through 6, illustrate that each of the plurality of apertures 20 comprises a plate 60 containing the photonic crystal 25. In some examples, the plurality of apertures 20 comprises a plurality of plates 60. The plate 60 may be configured as a substrate comprising material having appropriate transmission characteristics for the spectrum of interest. Each plate 60 comprises a field of view arrangement 62 to optically steer the path of light 35 in a different direction from other photonic crystals 25 contained in the holder 15. In some examples, the plate 60 may comprise glass, poly(methyl methacrylate) (PMMA), polyimide, plastic material, sapphire, polycarbonates, polymers, zinc-selenide, etc. The plate 60 may be flexible or rigid, may have any suitable shape, and may be configured at a sufficiently thin thickness (e.g., between approximately 1-4 mm) to permit the path of light 35 to pass therethrough. In one example, the hardness of the material of the plate 60 is sufficiently rigid to exist without an excessive thickness. In one example, the plate 60 may be configured as a single photonic crystal element that diverts the path of light 35 to a single region of an overall field of view. The nine circles depicted in the drawings represent the regions of the field of view that are covered by each photonic crystal 25. For instance, when the bottom center circle is highlighted, that photonic crystal in the holder 15 points/directs all light that enters the holder 15 to the bottom center of the field of view. In another example, field of view arrangement 62 may be partitioned using laser etching techniques or any other suitable technique to create multiple sections of the plate 60. In an example, the plate 60 may comprise a substantially entire volume of the aperture 20. In another example, the plate 60 may be positioned at one end of the aperture 20 or in the middle of the aperture 20, or at any other portion of the aperture 20 without having to consume the entire volume of the aperture 20.

Figure 8B:
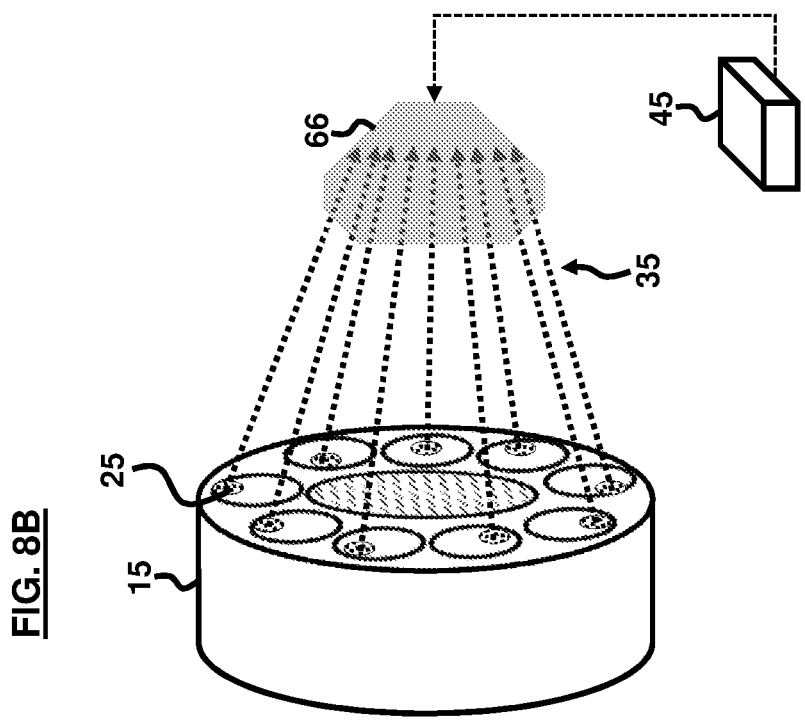
FIG. 8B is a schematic diagram illustrating a perspective view of a field of view arrangement of the plate of FIGS. 7A and 7B, according to an embodiment herein.

FIGS. 8A and 8B, with reference to FIGS. 1 through 7B, illustrates that the field of view arrangement 62 comprises a combination of positions 65 in the plate 60 where the photonic crystal 25 is disposed. In an example, the combination of positions 65 in the plate 60 where the photonic crystal 25 is disposed may be selected in any suitable combination. The plate 60 may be configured with a different angular offset, and may be mounted in its own respective rotational position 65, according to an example. The mounted plates 60 may be located on the primary optical axis and rotations of the plates 60 allows the field of view of the system 10 to be adjusted around the field of view. In an example, the areas of the plate 60 without the photonic crystal 25 contain the typical material (e.g., glass, PMMA, polyimide, plastic material, sapphire, polycarbonates, polymers, zinc-selenide, etc.) constituting the plate 60. In an example, the field of view arrangement 62 may be arranged such that the plate 60 is evenly segmented in any suitable number of segmented areas (i.e., positions 65). The figures show nine overlapping positions 65 in the plate 60. However, the embodiments herein are not restricted to any particular number of positions 65 or a particular arrangement (i.e., overlapping, non-overlapping, etc.). With respect to the plate 60, the positions 65 may comprise a central region 71, a left region 72, a right region 73, a top region 74, a bottom region 75, and one of each of four diagonal edge regions 76-79 which combine to create a full angle field of view 66 for the path of light 35 detected by the sensor 45.

For the central region 71, a photonic crystal 25 is configured to match the throughput of the other regions, but has zero angular deflection designed into the photonic crystal 25. For the top region 74, bottom region 75, left region 72, and right region 73, four copies of a single design of the photonic crystal 25 may be used comprising an angular deviation equal to $1/\sqrt{2}$ times the full angle field of view (approximately 0.707 times the field of view 66 of the collection optics of the system 10). These four photonic crystal elements are mounted in the rotating plurality of holders $15_1 \ldots 15_n$ with orientations of the angular deflection of the photonic crystal 25 as appropriate for the direction of deflection needed. Thus, the right side deflection element (e.g., the photonic crystal 25 in the right region 73) has a 180° orientation rotation about the axis when compared with the left side deflection element (e.g., the photonic crystal 25 in the left region 72). Both have equal magnitudes but the 180° difference changes the direction of the angular offset. Similarly, 90° and 270° of rotation yield the top and bottom elements (e.g., photonic crystals 25 in the top region 74 and bottom region 75). The four diagonal elements (e.g., photonic crystals 25 in the four diagonal edge regions 76-79) have a larger angular offset than the adjacent (top, bottom, left, right) elements (e.g., photonic crystals 25 in the top region 74, bottom region 75, left region 72, and the right region 73). These offsets are equal to the full angle field of view of the collection optics (not shown) of the system 10. The nine elements (e.g., photonic crystals 25) can be mounted in any desired order in the rotation stage, including sequential or non-sequential ordering.

In another example, the field of view arrangement 62 comprises a combination of positions 65 in the plate 60 where the photonic crystal 25 is disposed, and wherein the positions comprise a central region 71, either a left or right region 72, 73, and one of four diagonal edge regions 76-79 which combine to create a full angle field of view 66 for the path of light 35 detected by the sensor 45. As described above, the sensor 45 may be positioned at any suitable location in order to detect the full angle field of view 66. The sensor 66 may detect optical, thermal, electrical, or magnetic properties, or a combination thereof, associated with the path of light 35.

In another example, just three photonic crystals 25 are utilized; one on axis, one at the lateral offset, and one at the diagonal offset. These photonic crystals 25 are mounted in their own respective rotation stages (except for the on-axis plate which is mounted in a fixed mount 67 described with reference to FIG. 9). The rotation stages (and fixed mount 67 for on-axis crystal) are mounted within a common rotating mount (e.g., a common one of the plurality of holders $15_1$ . . . $15_n$). For the lateral plate, it is mounted such that at 0° rotation, its deflection points in one of the principal directions. For the diagonal plate, it is mounted such that at 0° rotation, its associated angular direction is along one of the diagonals.

In this embodiment, the rotating (outer) mount is rotated to the on-axis element to view the on-axis light. The rotating mount is then shifted to the lateral position and that plate is rotated to the 90°, 180°, 270°, and 0° rotations to capture the four adjacent field of regard elements. The rotating mount is likewise then rotated to the diagonal position and the plate is rotated to the 90°, 180°, 270°, and 0° rotations to capture the four diagonal field of regard elements. The order of selection and rotations of the plates is irrelevant as long as the collected information is processed accordingly.

The figures depict that the full angle field of view 66 is a relatively concentrated area such that the path of light 35 converges into a small field of view compared with the path of light 35 that first enters the holder 15 and passes through the photonic crystals 25. However, this depiction is for representation purposes only, and the full angle field of view 66 may actually be larger than what is depicted in the figures, and may constitute a larger area compared with the path of light 35 that first enters the holder 15 and passes through the photonic crystals 25. Accordingly, the embodiments herein are not limited to any particular relative size, area, or configuration for the full angle field of view 66 as it relates to the size, area, or configuration of the holder 15.

Figure 9:
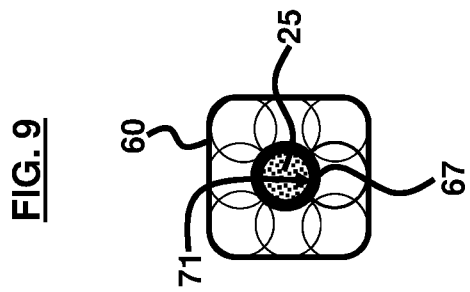
FIG. 9 is a schematic diagram illustrating the plate of FIG. 7A with a fixed holder, according to an embodiment herein.

FIG. 9, with reference to FIGS. 1 through 8B, illustrates that the plate 60 containing the central region position 71 of the photonic crystal 25 is mounted in a fixed holder 67 without movement. The fixed holder 67 may be affixed to the plate 60, and the photonic crystal 25 may be mounted in the fixed holder 67 using any suitable type of adhesive, connecting mechanism, or may utilize press fitting for retention of the photonic crystal 25 in the fixed holder 67. In this example, the fixed holder 67 may offer a more secured fixture for retaining the photonic crystal 25 on the plate 60. Furthermore, the fixed holder 67 may comprise any suitable shape, configuration, and material, according to the embodiments herein. Furthermore, in this example, the fixed holder 67 is held in place with respect to the plate 60 such that the fixed holder 67 does not move.

Figure 10:
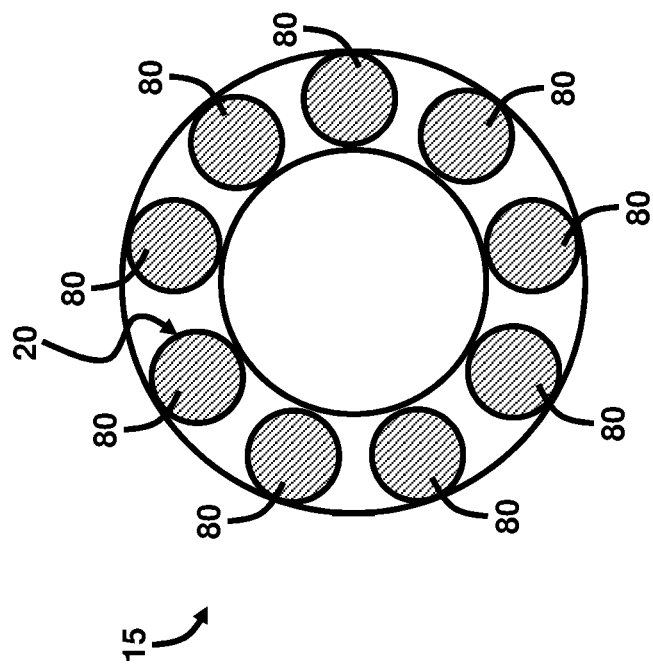
FIG. 10 is a schematic diagram illustrating the holder, with shutters, of the optical steering system of FIG. 1, according to an embodiment herein.

FIG. 10, with reference to FIGS. 1 through 9, illustrates that the system 10 comprises a shutter 80 over any or all of the plurality of apertures 20. The shutter 80 may be selectively opened or closed using any of mechanical, electrical, or magnetic triggers, or a combination thereof. Each shutter 80 may be independently controlled by a controller or processor (not shown) such some shutters may be opened while others are closed during operation of the system 10. In a closed position, the shutter 80 prevents the transmission of the path of light 35 from the photonic crystals 25 and out towards the full angle field of view 66. For example, the selective opening/closing of the shutters 80 in various sequences may allow for a strobe effect or change the overall intensity for the path of light 35 when creating and displaying the full angle field of view 66. The shutter 80 over each aperture 20 may be positioned so as not to structurally interfere with the photonic crystal 25 or plate 60 in the aperture 20. In some examples, the shutter 80 may be complete opaque, while in other examples, the shutter 80 may be translucent to provide filtering of the path of light 35 transmitted from the photonic crystal 25. In other examples, the shutter 80 may be translucent and colored to change the color of the path of light 35.

Figure 11:
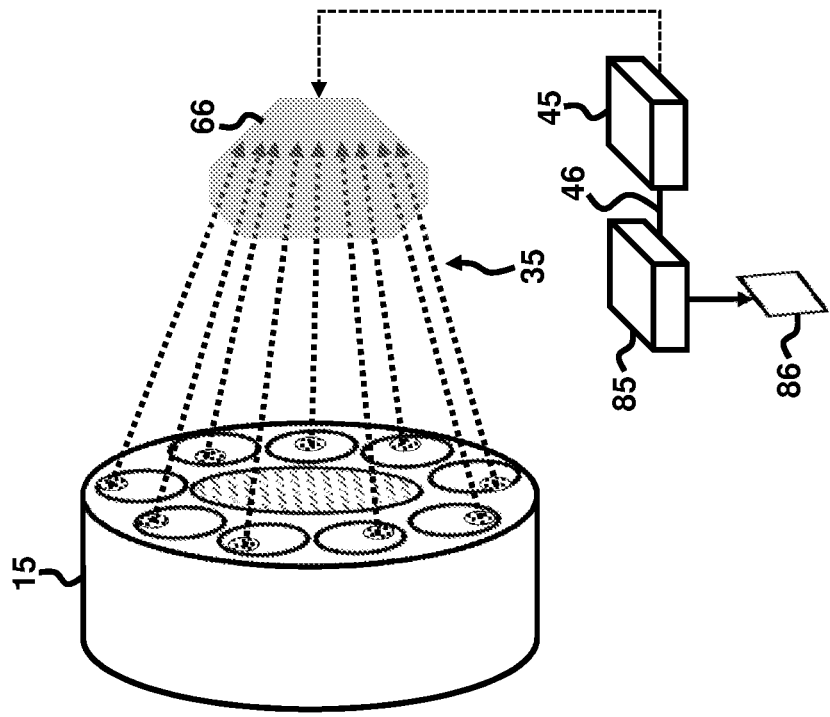
FIG. 11 is a schematic diagram illustrating the optical steering system of FIG. 1 with an image processor, according to an embodiment herein.

FIG. 11, with reference to FIGS. 1 through 10, illustrates that the system 10 comprises an image processor 85 operatively connected to the sensor 45 to create a total field of view image 86 based on the path of light 35 passing through each photonic crystal 25 sequentially for all photonic crystals 25 contained in the holder 15. The sensor 45 may detect any of optical, thermal, electrical, or magnetic properties, or a combination thereof, associated with the path of light 35 that creates the full angle field of view 66. The image processor 85 may be operatively connected to the sensor 45 either through a wired or wireless connection, in some examples. The image processor 85 receives electrical, magnetic, optical, or thermal signal(s) 46, or a combination thereof, from the sensor 45 and performs image processing to generate the total field view image 86, which corresponds to the full angle field of view 66. The total field view image 86 may be broadcast on a display screen (not shown) or may be outwardly projected (e.g., in a projector-like display). In an example, the image processor 85 may include a digital signal processor, central processing unit, microprocessors, and/or other hardware-enabled devices suitable for running firmware or other computer-executable instructions in order to perform the image processing functions utilized for generating the total field view image 86. The image processor 85 may be configured to enhance the total field view image 86 by performing any of noise reduction on the signal(s) 46 and performing image sharpening, demosaicing, and performing image transformation including filtering, or a combination thereof, in order to enhance the total field view image 86.

Figure 12:
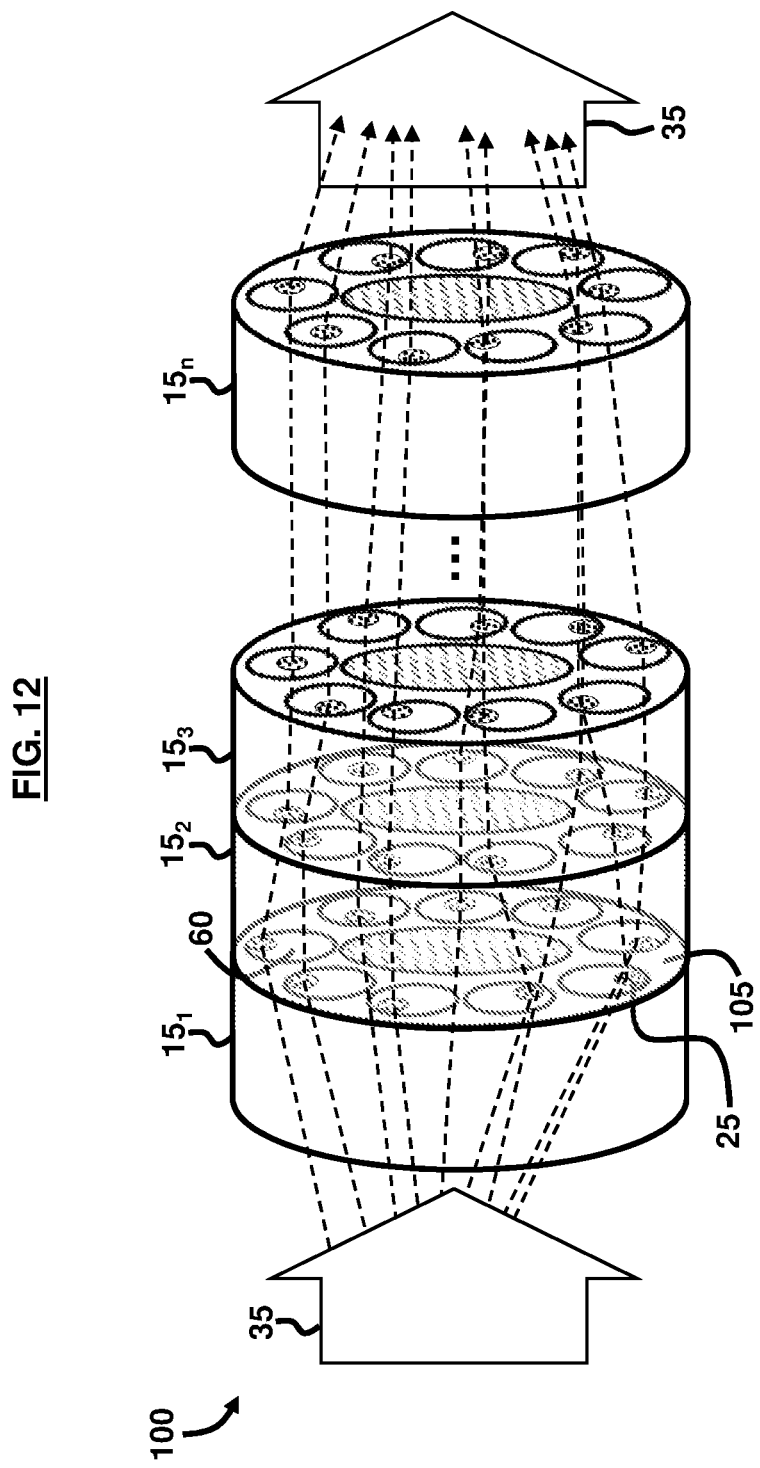
FIG. 12 is a schematic diagram illustrating an apparatus for transmitting light through photonic crystals, according to an embodiment herein.

FIG. 12, with reference to FIGS. 1 through 11, illustrates an apparatus 100 comprising a plurality of ring-shaped holders $15_1$ . . . $15_n$ each comprising a plurality of optically configured plates 60 circumferentially arranged on a rim 105 of the holders $15_1$ . . . $15_n$. The holders $15_1$ . . . $15_n$ may include any suitable configuration or shape and comprise any suitable material. Some example configurations and shapes are rings, plates, and spheres. Some example materials include durable plastics, lightweight metals, and composites. In some examples, the optically configured plates 60 may be configured in pairs. The optically configured plates 60 may be configured as substrates comprising material having appropriate transmission characteristics for the spectrum of interest. The number of the plurality of optically configured plates 60 may vary depending on the size, shape, and/or configuration of the holders $15_1 \ldots 15_n$. Moreover, the size of the plurality of optically configured plates 60 may be any suitable size, which may also be based, in part, on the size, shape, and/or configuration of the holders $15_1 \ldots 15_n$. Furthermore, the plurality of optically configured plates 60 in the holders $15_1 \ldots 15_n$ may include consistent sizes, according to one example; e.g., all of the plurality of optically configured plates 60 constitute the same size and configuration. In another example, the plurality of optically configured plates 60 may have inconsistent sizes; e.g., the plurality of optically configured plates 60 do not have the same size and configuration as one another. The size(s), shape(s), and configurations of the plurality of optically configured plates 60 may be selected based on any suitable size, shape, and configuration. For example, the plurality of optically configured plates 60 may be circular or non-circular shaped. Furthermore, according to an example, the plurality of optically configured plates 60 may be configured to extend through the entire width (i.e., thickness) of the holders $15_1 \ldots 15_n$. In other examples, the plurality of optically configured plates 60 may have a relatively thin thickness (i.e., between approximately 1-4 mm) and selectively positioned in the holders $15_1 \ldots 15_n$. In some examples, the optically configured plates 60 may comprise glass, PMMA, polyimide, plastic material, sapphire, polycarbonates, polymers, zinc-selenide, etc. The optically configured plates 60 may be flexible or rigid. In one example, the hardness of the material of the optically configured plates 60 is sufficiently rigid to exist without an excessive thickness.

In one example, the plurality of holders $15_1 \ldots 15_n$ may be directly connected to one another in a stacked configuration. In another example, the plurality of holders $15_1 \ldots 15_n$ may be aligned to one another with a gap between each of the plurality of holders $15_1 \ldots 15_n$. Furthermore, the plurality of holders $15_1 \ldots 15_n$ may be aligned in a uniform, stacked manner. Moreover, the plurality of holders $15_1 \ldots 15_n$ may be aligned in any other suitable arrangement. The plurality of holders $15_1 \ldots 15_n$ may be held together using any suitable attachment mechanism or material, and may, for example, utilize mechanical, magnetic, or adhesives, or combinations thereof to connect the plurality of holders $15_1 \ldots 15_n$ together. In an example, a rod or any other type of elongated member (not shown) may be used to retain the plurality of holders $15_1 \ldots 15_n$ together.

The apparatus 100 further comprises a photonic crystal 25 positioned in each of the plurality of optically configured plates 60. In some examples, the photonic crystal 25 may comprise any of periodic dielectric, metallo-dielectric, and superconductor microstructures or nanostructures, which may be configured as any of one-dimensional, two-dimensional, and three-dimensional crystals. According to an example, the photonic crystal 25 may be a spatially variant photonic crystal containing materials with a low refractive index, which allows for enhanced control of optical beam steering. The spatially variant photonic crystal may comprise any of periodic dielectric, semiconductor, metallic, metallo-dielectric, and superconductor microstructures or nanostructures. Moreover, the spatially variant photonic crystal may bend, focus, or polarize electromagnetic or optic beams, or any combination thereof. The photonic crystal 25 embodied as a spatially variant photonic crystal may be self-collimating while re-directing energy at an angle of 90°. Other, lower angular deviations are also possible.

Furthermore, the photonic crystal 25 may comprise one or more colors or may be substantially clear. The photonic crystal 25 is configured to permit a path of light 35 to be transmitted therethrough. The path of light 35 may be emitted in a substantially uniform manner or may be directed non-uniformly, and may comprise any color or stream of colors, according to various examples. In some examples, only portions of the path of light 35 are directed through the photonic crystal 25, or the path of light 35 may be directed in phases and intensities in a strobe-like effect. The path of light 35 may be directed at any suitable angle. Furthermore, the path of light 35 may be directed at any suitable intensity level.

The movement of the plurality of ring-shaped holders $15_1 \ldots 15_n$ directs the path of light 35 to be transmitted through each photonic crystal 25 in sequence with respect to the plurality of optically configured plates 60. In this regard, the path of light 35 may be held at a fixed position/direction while the plurality of ring-shaped holders $15_1 \ldots 15_n$ may move in any of a translational and rotational motion, or a combination thereof, causing the path of light 35 to intersect each photonic crystal 25 in the plurality of optically configured plates 60. This may occur in a sequential manner, according to an example. In another example, the path of light 35 may be directed through each photonic crystal 25 simultaneously or selectively in a pulse-like manner.

Figure 13:
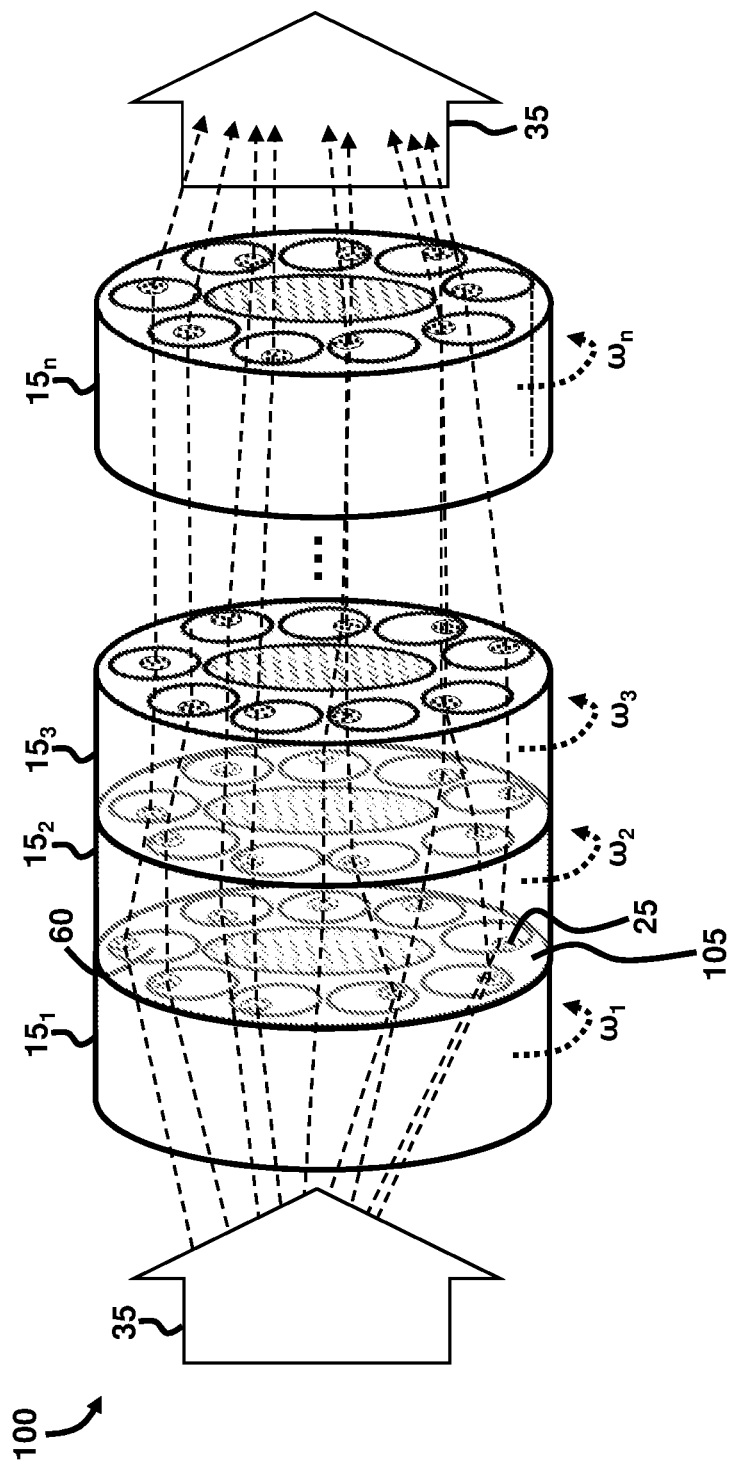
FIG. 13 is a schematic diagram illustrating the apparatus of FIG. 12 with rotational ring-shaped holders, according to an embodiment herein.

FIG. 13, with reference to FIGS. 1 through 12, illustrates that the movement of the plurality of ring-shaped holders $15_1 \ldots 15_n$ comprises a rotational movement $\omega_1 \ldots \omega_n$. In an example, the rotational movement $\omega_1 \ldots \omega_n$ may comprise different rotational speeds or they may comprise the same rotational speed. However, the plurality of holders $15_1 \ldots 15_n$ may be independently controlled to move independently; i.e., with independent rotational movement $\omega_1 \ldots \omega_n$. According to some examples, the rotational movement $\omega_1 \ldots \omega_n$ may be in a clockwise or counter-clockwise motion.

As shown in FIGS. 12 and 13, the photonic crystal 25 in each plate 60 is configured to direct a different light segment of the path of light 35 out of each of the plurality of optically configured plates 60. In this example, the overall path of light 35 may be segmented while traversing the plurality of ring-shaped holders $15_1 \ldots 15_n$ due to the discrete plurality of optically configured plates 60 that are structurally separated from one another. This separation causes the photonic crystals 25 to be structurally separated from each other, which directs a different light segment of the path of light 35. The figures depict that the path of light 35 may converge in a relatively concentrated area after being transmitted from the plurality of ring-shaped holders $15_1 \ldots 15_n$ such that the path of light 35 converges into a small field of view compared with the path of light 35 that first enters the plurality of ring-shaped holders $15_1 \ldots 15_n$ and passes through the photonic crystals 25. However, this depiction is for representation purposes only, and the path of light 35 that is transmitted through/from the plurality of ring-shaped holders $15_1 \ldots 15_n$ may actually be larger than what is depicted in the figures, and may constitute a larger area compared with the path of light 35 that first enters the plurality of ring-shaped holders $15_1 \ldots 15_n$ and passes through the photonic crystals 25. Accordingly, the embodiments herein are not limited to any particular relative size, area, or configuration for the path of light 35 as it relates to the size, area, or configuration of the plurality of ring-shaped holders $15_1 \ldots 15_n$.

Figure 14A:
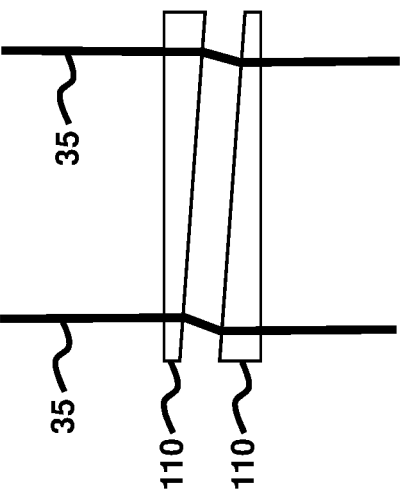
FIG. 14A is a schematic diagram illustrating optical beam steering using Risley prisms with no angle offset, according to an embodiment herein.
Figure 14B:
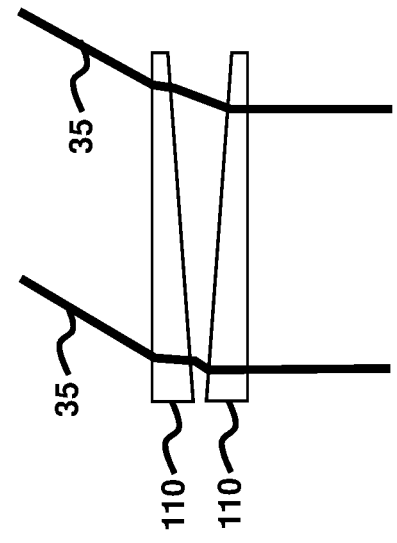
FIG. 14B is a schematic diagram illustrating optical beam steering using Risley prisms with an induced angle offset, according to an embodiment herein.
Figure 14C:
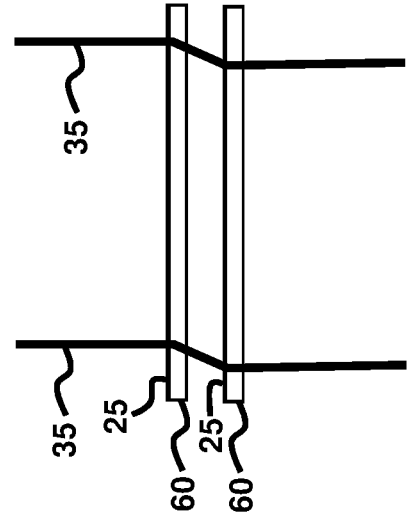
FIG. 14C is a schematic diagram illustrating optical beam steering using photonic crystals with no angle offset, according to an embodiment herein.
Figure 14D:
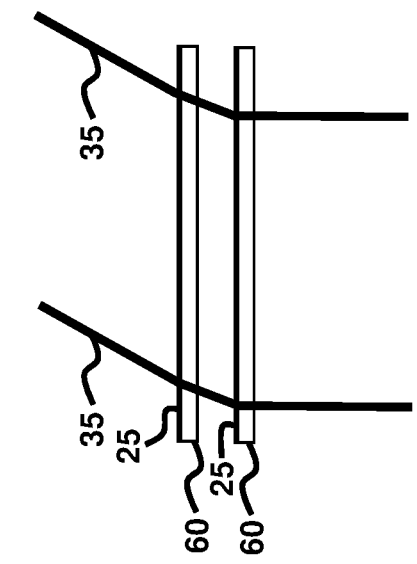
FIG. 14D is a schematic diagram illustrating optical beam steering using photonic crystals with an induced angle offset, according to an embodiment herein.

FIGS. 14A through 14D, with reference to FIGS. 1 through 13, illustrates that the optically configured plates 60 may comprise Risley prisms 110 for steering paths of light 35 therethrough. The Risley prisms 110 can be used for steering the paths of light 35 with no angle (as shown in FIG. 14A) or with an induced angle (as shown in FIG. 14B). The two prisms 110 may be rotated to effect various steering angles around the two-dimensional angular region of interest. Two photonic crystal structures with equal angular deviations are mounted in separate, inline rotation stages. These rotation stages can then be rotated to steer the field of view around the field of regard as desired. Multiple pairs can be cascaded to provide improved steering resolution or angular range. Polarization gratings and photonic crystal beam steering can be accomplished with no angle (as shown in FIG. 14C) or with an angular offset (as shown in FIG. 14D), in a completely analogous manner to the Risley prisms 110 of FIGS. 14A and 14B but with no induced aberrations. Accordingly, as shown in FIGS. 14C through 14D the plurality of optically configured plates 60 each comprise a pair of photonic crystals 25 having equal angular deviations for the transmitted path of light 35. All embodiments can be utilized in steering mirror applications such that the location of the sensor 45 is replaced with the light source 30 (or another light source) and the photonic crystals 25 are used to steer the beam (e.g., path of light 35) around a region of interest.

FIG. 15, with reference to FIGS. 1 through 14D, illustrates a system 150 of performing optical beam steering. The system 150 comprises a region 155 to scan over a field of view. The region 155 may be any suitably-sized region 155 and the scanning may occur through electromagnetic, optical, radiation, electrical, or thermal scanning, or a combination thereof. Furthermore, the region 155 to scan may be a stationary region or a moving region. The system 150 further comprises a beam steering device 160 positioned with respect to the region 155 to scan. The beam steering device 160 may be configured as any of an electromagnetic, electromechanical, or optic device, or a combination thereof, and may be positioned at any location with respect to the region 155 to scan including being remotely positioned from the region 155 to scan. Furthermore, the beam steering device 160 may include any suitable configuration or shape and comprise any suitable material. Some example configurations and shapes are rings, plates, and spheres. Some example materials include durable plastics, lightweight metals, and composites.

The beam steering device 160 comprises a plurality of optically configured plates 60 each containing a photonic crystal 25. In some examples, the optically configured plates 60 may be configured in pairs. The optically configured plates 60 may be configured as substrates comprising material having appropriate transmission characteristics for the spectrum of interest. The number of the plurality of optically configured plates 60 may vary depending on the size, shape, and/or configuration of the beam steering device 160. Moreover, the size of the plurality of optically configured plates 60 may be any suitable size, which may also be based, in part, on the size, shape, and/or configuration of the beam steering device 160. Furthermore, the plurality of optically configured plates 60 in the beam steering device 160 may include consistent sizes, according to one example; e.g., all of the plurality of optically configured plates 60 constitute the same size and configuration. In another example, the plurality of optically configured plates 60 may have inconsistent sizes; e.g., the plurality of optically configured plates 60 do not have the same size and configuration as one another. The size(s), shape(s), and configurations of the plurality of optically configured plates 60 may be selected based on any suitable size, shape, and configuration. For example, the plurality of optically configured plates 60 may be circular or non-circular shaped. Furthermore, according to an example, the plurality of optically configured plates 60 may be configured to extend through the entire width (i.e., thickness) of the beam steering device 160. In other examples, the plurality of optically configured plates 60 may have a relatively thin thickness (i.e., between approximately 1-4 mm) and selectively positioned in the beam steering device 160. In some examples, the optically configured plates 60 may comprise glass, PMMA, polyimide, plastic material, sapphire, polycarbonates, polymers, zinc-selenide, etc. The optically configured plates 60 may be flexible or rigid. In one example, the hardness of the material of the optically configured plates 60 is sufficiently rigid to exist without an excessive thickness. In some examples, the photonic crystal 25 may comprise any of periodic dielectric, metallo-dielectric, and superconductor microstructures or nanostructures, which may be configured as any of one-dimensional, two-dimensional, and three-dimensional crystals. Furthermore, the photonic crystal 25 may comprise one or more colors or may be substantially clear. The photonic crystal 25 is configured to permit a path of light 35 to be transmitted therethrough.

The path of light 35 is sequentially directed through the plurality of optically configured plates 60. The path of light 35 may be directed from a light source (not shown in FIG. 15). The path of light 35 may be emitted in a substantially uniform manner or may be directed non-uniformly, and may comprise any color or stream of colors, according to various examples. In some examples, only portions of the path of light 35 are directed through the photonic crystal 25, or the path of light 35 may be directed in phases and intensities in a strobe-like effect. The path of light 35 may be directed at any suitable angle. Furthermore, the path of light 35 may be directed at any suitable intensity level. The figures depict that the path of light 35 may converge in a relatively concentrated area after being transmitted from the plurality of optically configured plates 60 such that the path of light 35 converges into a small field of view compared with the path of light 35 that first enters the plurality of optically configured plates 60 and passes through the photonic crystals 25. However, this is depiction is for representation purposes only, and the path of light 35 that is transmitted through/from the plurality of optically configured plates 60 may actually be larger than what is depicted in the figures, and may constitute a larger area compared with the path of light 35 that first enters the plurality of optically configured plates 60 and passes through the photonic crystals 25. Accordingly, the embodiments herein are not limited to any particular relative size, area, or configuration for the path of light 35 as it relates to the size, area, or configuration of the plurality of optically configured plates 60 and/or the beam steering device 160.

The system 150 further comprises a controller 165 to control a timing sequence for the beam steering device 160 to move. The timing sequence causes a time delay of the plurality of optically configured plates 60 in the beam steering device 160 to intersect the path of light 35. In some examples, the controller 165 may be any type of computer, processor, microcontroller, application specific processor, application specific integrated circuit, or digital signal processor, and may be operatively connected to the beam steering device 160 through any of a wireless or wired connection. According to an example, the controller 165 comprises a motion controller that controls the movement of the beam steering device 160 in any of a translational and rotational movement, or a combination thereof. In an example, the controller 165 may be part of the beam steering device 160.

Figure 16:
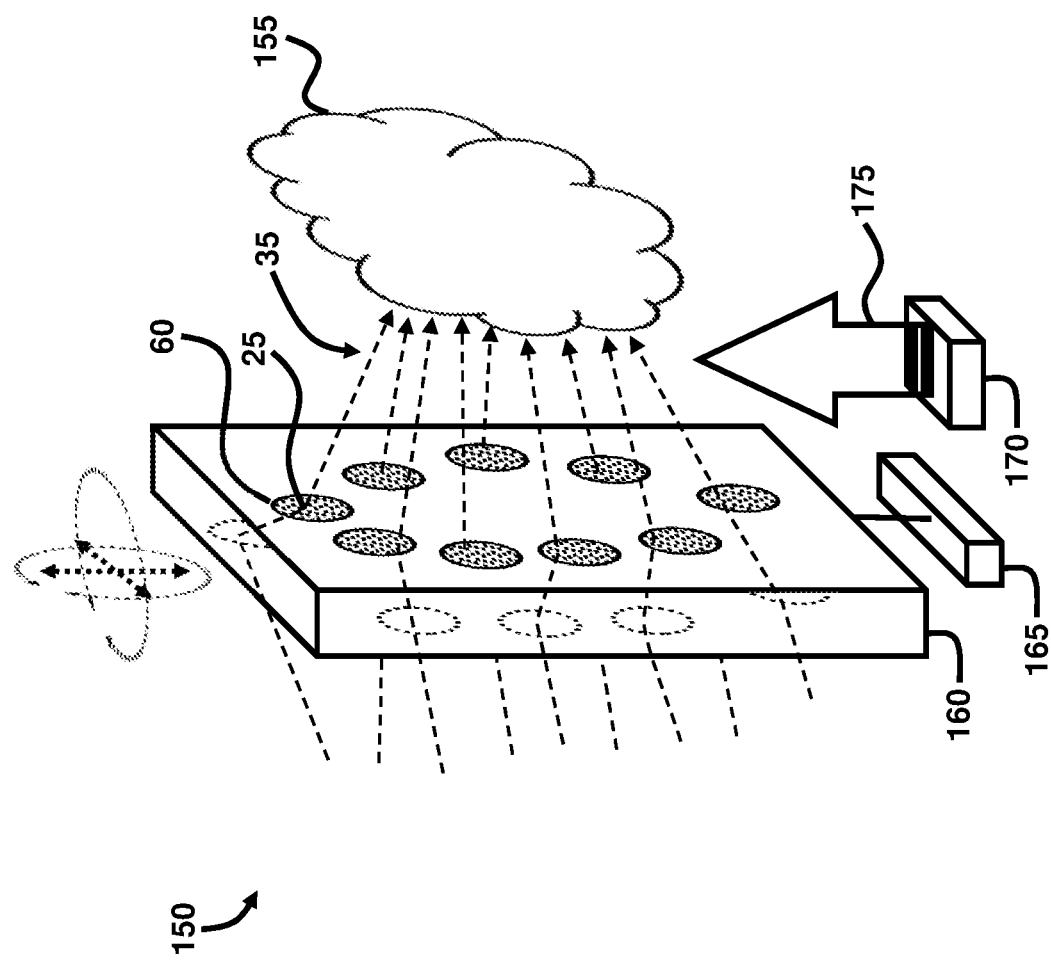
FIG. 16 is a schematic diagram illustrating the system for performing optical beam steering of FIG. 15 with a camera, according to an embodiment herein.

FIG. 16, with reference to FIGS. 1 through 15, illustrates that the system 150 comprises a camera 170 to capture a sequence of images 175 from the intersecting path of light 35. The camera 170 may comprise any type of image capturing device and may be positioned at any location with respect to the path of light 35 emanating from the plurality of optically configured plates 60 in the beam steering device 160. Furthermore, the camera 170 may be part of the beam steering device 160 and/or controller 165 in some examples. In an example, the sequence of images 175 may be digital images that are stored in the camera 170 or remotely stored at another location/device in the system 150.

Figure 17:
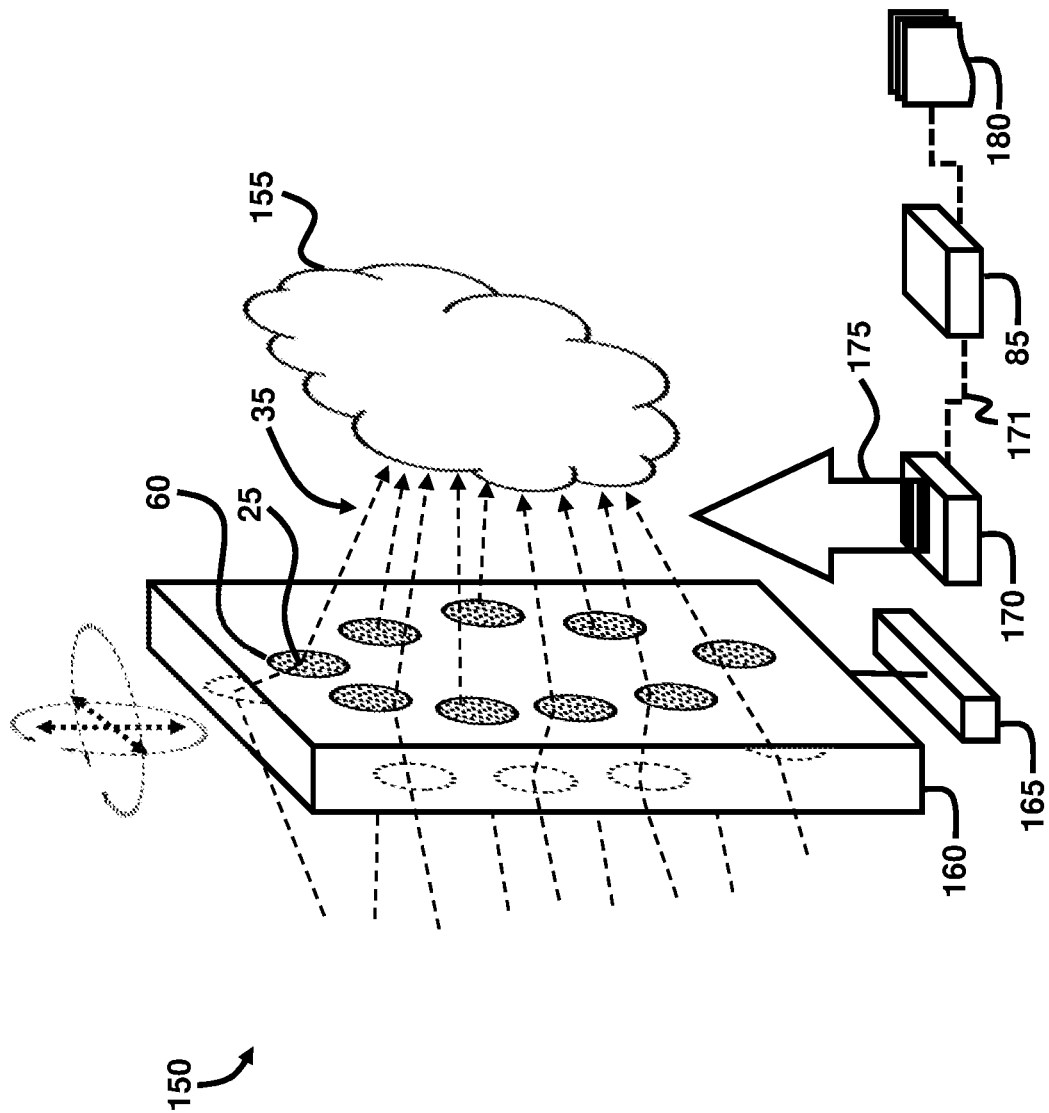
FIG. 17 is a schematic diagram illustrating the system for performing optical beam steering of FIG. 15 with an image processor, according to an embodiment herein.

FIG. 17, with reference to FIGS. 1 through 16, illustrates that the system 150 comprises an image processor 85 to perform image processing on the sequence of images 175 by extracting images 180 based on predetermined criteria. The image processor 85 may be operatively connected to the camera 170 either through a wired or wireless connection, in some examples. The image processor 85 receives electrical signal(s) 171 from the camera 170 and performs image processing to generate the extracted images 180 from the sequence of images 175. The extracted images 180 may be broadcast on a display screen (not shown) or may be outwardly projected (e.g., in a projector-like display). In an example, the image processor 85 may include a digital signal processor, central processing unit, microprocessors, and/or other hardware-enabled devices suitable for running firmware or other computer-executable instructions in order to perform the image processing functions utilized for generating the extracted images 180. The image processor 85 may be configured to enhance the sequence of images 175 by performing any of noise reduction on the signal(s) 171 and performing image sharpening, demosaicing, and performing image transformation including filtering, or a combination thereof, in order to generate and select the extracted images 180 for display.

FIG. 18A, with reference to FIGS. 1 through 17, is a flowchart illustrating a method 200 of performing optical beam steering. The method 200 comprises selecting (205) a region 155 to scan. The selection of the region 155 to scan may be based on a predetermined selection or may be conducted "on the fly". The method 200 comprises positioning (210) a beam steering device 160 with respect to the region 155 to scan. The beam steering device 160 comprises a plurality of optically configured plates 60 each containing an optical element that provides a fixed angular offset. In some examples, the optical element comprises a photonic crystal 25, wedge prisms, or diffractive waveplates, etc. The beam steering device 160 may be positioned at any suitable location with respect to the region 155 to scan, and may further be moved or repositioned during the beam steering process. The fabrication methods for the photonic crystal 25 are generally specific to the photonic crystal design selected. Similarly, the actual photonic crystal designs depend on the spectrum of interest, polarization characteristics, deflection angle desired, substrate materials, FOV, etc.

The method 200 comprises directing (215) a path of light 35 sequentially through the plurality of optically configured plates 60. The sequential directing of the path of light 35 may occur at any duration or frequency and may occur simultaneously. The path of light 35 may be directed from a light source 30. According to some examples, the light source 30 may comprise an IR LED, a fluorescent lamp, or other type of component capable of directing the path of light 35. The method 200 comprises controlling (220) a timing sequence for the beam steering device 160 to move. The timing sequence causes a time delay of the plurality of optically configured plates 60 in the beam steering device 160 to intersect the path of light 35. The timing sequence for the movement of the beam steering device 160 may be controlled by a motion controller 40 or controller 165, according to some examples.

FIG. 18B, with reference to FIGS. 1 through 18A, is a flowchart illustrating that the method 200 comprises capturing (225) a sequence of images 175 from the intersecting path of light 35. The capturing of the sequence of images 175 may occur using a camera 170 or any other type of image and/or video capturing device. Moreover, the sequence of images 175 may be stored, for retrieval, in a memory or storage device (not shown), and in some examples, may be locally stored in the camera 170.

FIG. 18C, with reference to FIGS. 1 through 18B, is a flowchart illustrating that the method 200 comprises performing (230) image processing on the sequence of images 175 by extracting images 180 based on predetermined criteria. In an example, the image processing is performed by an image processor 85, which may be programmed to select images 180 based on desired optical, electromagnetic, or energy signatures, or a combination thereof, or other signatures. For example, images 180 that meet a predetermined criteria for displaying or containing a predetermined threshold of displayed characteristics are selected for further processing, display, storage, etc.

The embodiments herein may be utilized in optical beam steering in a variety of applications including free space communications, space applications (including communications and solar power), laser light shows, laser-based manufacturing and quality control, wide field of view sensors, extremely large field projection systems (display/entertainment or test applications), illumination applications such as solar harvesting, greenhouses, wide field of regard sensors, as well as other applications. The embodiments herein can overcome the limitations of the conventional solutions, having no path offset, having lower cost than LCoS, can be designed for broad spectrum use, does not introduce chromatic or monochromatic aberrations, and can be insensitive to polarization. Furthermore, the embodiments herein reduce the size and weight of beam steering systems compared with conventional mirror-based systems, and simplify the optical path from the folded system requirements of conventional mirrored systems.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. An optical steering system comprising:
   a holder comprising a plurality of apertures;
   a photonic crystal mounted in each of the plurality of apertures;
   a light source to direct a path of light through the photonic crystal;
   a motion controller to control movement of the holder to sequentially insert each photonic crystal of the plurality of apertures into the path of light; and
   a sensor to detect optical energy arriving from each direction of the path of light passing through each photonic crystal.

2. The system of claim 1, wherein the holder comprises a ring-shaped device comprising the plurality of apertures arranged circumferentially thereon.

3. The system of claim 1, comprising a plurality of holders adjacent to one another and each comprising the plurality of apertures containing each photonic crystal.

4. The system of claim 3, wherein the motion controller controls the plurality of holders to move independently of one another.

5. The system of claim 3, wherein each of the plurality of holders are configured with a different angular offset with respect to each other and the path of light.

6. The system of claim 1, wherein the plurality of apertures comprises nine apertures.

7. The system of claim 1, wherein each of the plurality of apertures comprises a plate containing the photonic crystal, and wherein the plate comprises a field of view arrangement to optically steer the path of light in a different direction from other photonic crystals contained in the holder.

8. The system of claim 7, wherein the field of view arrangement comprises a combination of positions in the plate where the photonic crystal is disposed, and wherein the positions comprise a central region, a left region, a right region, a top region, a bottom region, and one of each of four diagonal edge regions which combine to create a full angle field of view for the path of light detected by the sensor.

9. The system of claim 7, wherein the field of view arrangement comprises a combination of positions in the plate where the photonic crystal is disposed, and wherein the positions comprise a central region, either a left or right region, and one of four diagonal edge regions which combine to create a full angle field of view for the path of light detected by the sensor.

10. The system of claim 9, wherein the plate containing the central region position of the photonic crystal is mounted in a fixed holder without movement.

11. The system of claim 1, comprising a shutter over any or all of the plurality of apertures.

12. The system of claim 1, comprising an image processor operatively connected to the sensor to create a total field of view image based on the path of light passing through each photonic crystal sequentially for all photonic crystals contained in the holder.

13. An apparatus comprising:
    a plurality of ring-shaped holders each comprising a plurality of optically configured plates circumferentially arranged on a rim of the holders; and
    a photonic crystal positioned in each of the plurality of optically configured plates, wherein the photonic crystal is configured to permit a path of light to be transmitted therethrough,
    wherein movement of the ring-shaped holders directs the path of light to be transmitted through each photonic crystal in sequence with respect to the plurality of optically configured plates.

14. The apparatus of claim 13, wherein the photonic crystal comprises a spatially variant photonic crystal.

15. The apparatus of claim 13, wherein the movement of the plurality of ring-shaped holders comprises a rotational movement.

16. The apparatus of claim 13, wherein the photonic crystal in each plate is configured to direct a different light segment of the path of light out of each of the plurality of optically configured plates.

17. The apparatus of claim 13, wherein the plurality of optically configured plates each comprise a pair of photonic crystals having equal angular deviations for a transmitted path of light.

18. A method of performing optical beam steering, the method comprising:
    selecting a region to scan;
    positioning a beam steering device with respect to the region to scan, wherein the beam steering device comprises a plurality of optically configured plates each containing an optical element that provides a fixed angular offset;
    directing a path of light sequentially through the plurality of optically configured plates; and
    controlling a timing sequence for the beam steering device to move, wherein the timing sequence causes a time delay of the plurality of optically configured plates in the beam steering device to intersect the path of light.

19. The method of claim 18, comprising capturing a sequence of images from the intersecting path of light.

20. The method of claim 19, comprising performing image processing on the sequence of images by extracting images based on predetermined criteria.

* * * * *